United States Patent
Hasegawa et al.

(10) Patent No.: US 10,567,618 B2
(45) Date of Patent: Feb. 18, 2020

(54) CORRECTING SHARING RATIOS OF NOZZLE GROUPS IN OVERLAPPING IMAGE REGION AND CORRECTING COLOR CONVERSION TABLE BASED THEREON

(71) Applicant: SEIKO EPSON CORPORATION, Tokyo (JP)

(72) Inventors: Tomonaga Hasegawa, Matsumoto (JP); Yasutoshi Takeuchi, Shiojiri (JP); Tetsuya Matsumura, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/353,833

(22) Filed: Mar. 14, 2019

(65) Prior Publication Data
US 2019/0286955 A1   Sep. 19, 2019

(30) Foreign Application Priority Data

Mar. 16, 2018  (JP) .................................. 2018-048960

(51) Int. Cl.
| | |
|---|---|
| *H04N 1/58* | (2006.01) |
| *G06K 15/02* | (2006.01) |
| *G06K 15/10* | (2006.01) |
| *H04N 1/60* | (2006.01) |
| *H04N 1/034* | (2006.01) |
| *B41J 2/21* | (2006.01) |
| *B41J 2/205* | (2006.01) |

(52) U.S. Cl.
CPC .............. *H04N 1/58* (2013.01); *B41J 2/2054* (2013.01); *B41J 2/2132* (2013.01); *G06K 15/102* (2013.01); *G06K 15/188* (2013.01); *G06K 15/1809* (2013.01); *H04N 1/034* (2013.01); *H04N 1/6019* (2013.01)

(58) Field of Classification Search
None
See application file for complete search history.

(56) References Cited

U.S. PATENT DOCUMENTS

| | | | |
|---|---|---|---|
| 9,302,471 B2 * | 4/2016 | Kobayashi | ............. B41J 2/2054 |
| 2011/0221816 A1 | 9/2011 | Miyamoto | |
| 2015/0254538 A1 | 9/2015 | Fukazawa et al. | |

FOREIGN PATENT DOCUMENTS

| | | |
|---|---|---|
| JP | 2011-189512 A | 9/2011 |
| JP | 2015-168086 A | 9/2015 |

\* cited by examiner

*Primary Examiner* — Scott A Rogers
(74) *Attorney, Agent, or Firm* — Foley & Lardner LLP

(57) ABSTRACT

An image processing method for generating printing data includes correcting, in accordance with a degree of reduction in a dot coverage below a predetermined dot coverage in a region that undergoes printing in an overlapped manner by a first nozzle group and a second nozzle group, at least either of a first sharing ratio for the first nozzle group sharing positions of dots to be formed in an overlapping image region and a second sharing ratio for the second nozzle group sharing positions of dots to be formed to allow a total ratio of the first sharing ratio and the second sharing ratio to exceed 100%, and correcting a color conversion table based on the first sharing ratio and the second sharing ratio, after the correcting of at least either of the first sharing ratio and the second sharing ratio.

7 Claims, 14 Drawing Sheets

CORRECTING SHARING RATIOS OF NOZZLE GROUPS IN OVERLAPPING IMAGE REGION AND CORRECTING COLOR CONVERSION TABLE BASED THEREON

BACKGROUND

1. Technical Field

The invention relates to an image processing method, a color conversion table creation method, an image processing device, and a printing system involving a printing apparatus configured to discharge ink droplets onto a printing medium to carry out printing.

2. Related Art

When band printing is performed with a serial printer, variations in accuracy when a printing medium is fed, for example, may result in banding at a joint of bands (white lines due to expanded gaps and black lines due to narrowed gaps). Partial overlapping (POL) printing is one of known arts addressing this problem. In POL printing, after a printing head performs a scan onto a sheet to perform printing corresponding to a band, the sheet is fed in a sub-scanning direction at a distance narrower than a width of the band in the sub-scanning direction. The printing head then separately performs a next scan onto the sheet so that a region of a next band partially overlaps with the region of the band to perform the printing. By providing POL regions separately undergoing printing through two scans, observable banding can be reduced (lowered).

In a line printer including a line head including a plurality of head chips arranged in series in a width direction of a printing medium, in order to suppress banding from occurring at boundaries of the head chips, the head chips are arranged so as to partially overlap with each other to provide POL regions that separately undergo printing by two heads.

JP-A-2015-168086 describes a printing control device configured to control printing where a printing region includes overlapping regions (POL regions) that undergo printing with a plurality of scans. The printing control device includes a printing data generating unit configured to generate, based on image data of a printing target, printing data to be used per each of the plurality of scans in the overlapping regions. The printing data generating unit generates printing data to be used per each of the plurality of scans. The printing data is corrected (correction for an ink injection ratio) in accordance with concentrations in overlapping regions in image data.

The printing control device corrects an ink injection ratio (an overlapping injection ratio) in accordance with concentrations in overlapping regions (POL regions) in image data. By increasing an overlapping injection ratio as a concentration increases, black lines can be further easily reduced in a region with lower concentration, whereas white lines can be further easily reduced in a region with higher concentration. That is, even when POL printing is performed with a serial printer, white lines and black lines, which may be observed when ink landing positions shift due to variations in printing head characteristics and accuracy of attachment, for example, can be reduced.

With the printing control device described in JP-A-2015-168086, black lines can be further easily reduced in regions with lower concentration, whereas white lines can be further easily reduced in regions with higher concentration in banding observed in overlapping regions (POL regions) in image data. However, color differences (tone differences) to be generated in the overlapping regions (POL regions) may not be reduced. That is, although banding generated and observed due to tone differences generated in overlapping regions (POL regions) can be reduced by correcting an ink injection ratio (an overlapping injection ratio), banding due to color differences generated when overlapping regions (POL regions) separately undergo printing through two scans, or due to color differences generated and observed when an ink injection ratio (overlapping injection ratio) is corrected cannot be reduced.

SUMMARY

An image processing method according to an aspect of the application is for generating, based on image data, printing data used to cause a printing apparatus to execute printing. The printing apparatus is configured to cause a first nozzle group and a second nozzle group to discharge ink droplets to form dots on a printing medium to print a print image based on the image data. The image processing method includes correcting, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and correcting a color conversion table used to convert color space data of the image data corresponding to the overlapping image region into color space data of the printing data to correct color of a print image of the overlapping image region printed based on the first sharing ratio and the second sharing ratio after the correcting of at least either of the first sharing ratio and the second sharing ratio.

In the image processing method described above, the print image includes a non-overlapping image region that undergoes printing by the first nozzle group or the second nozzle group and the overlapping image region, and, in the correcting of color, color of the print image of the overlapping image region is corrected based on a print image of the non-overlapping image region.

An image processing device according to a further aspect of the application is for generating, based on image data, printing data used to cause a printing apparatus to execute printing. The printing apparatus is configured to cause a first nozzle group and a second nozzle group to discharge ink droplets to form dots on a printing medium to print a print image based on the image data. The image processing device includes, a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and a color correction unit configured to correct, a color conversion table used to convert color space data of the image data corresponding to the overlapping image region into color space data of the printing data to correct color of a print image of the overlapping image region printed based on the first sharing ratio and the second sharing ratio, after the correcting of at least either of the first sharing ratio and the second sharing ratio by the sharing ratio correction unit.

A printing system according to a still further aspect of the application includes a printing apparatus configured to cause a first nozzle group and a second nozzle group to discharge ink droplets to form dots on a printing medium to print a print image based on image data, and an image processing device that includes a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and a color correction unit configured to correct a color conversion table used to convert color space data of the image data corresponding to the overlapping image region into color space data of printing data to correct color of a print image of the overlapping image region when the print image is printed based on the first sharing ratio and the second sharing ratio after the correcting of at least either of the first sharing ratio and the second sharing ratio by the sharing ratio correction unit. The image processing device is configured to generate, based on the image data, the printing data used to cause the printing apparatus to execute printing.

The printing system described above may include a user interface configured to allow at least either of the first sharing ratio and the second sharing ratio to be changed.

The printing system described above may include a user interface configured to allow a degree of correction for the color conversion table to be set.

A color conversion table creation method according to a still further aspect of the application, for use in a printing apparatus configured to cause a first nozzle group and a second nozzle group to discharge ink droplets to form dots on a printing medium to perform printing, is for creating a color conversion table used to convert color space data of image data into color space data of printing data. The color conversion table creation method includes performing first printing for forming a first print image based on image data having a single concentration based on a color conversion table before correction in an overlapping image region that undergoes printing by the first nozzle group and the second nozzle group and a non-overlapping image region that undergoes printing by the first nozzle group or the second nozzle group, correcting, in accordance with a degree of reduction in a dot coverage in the first print image formed in the overlapping image region relative to a dot coverage in the first print image formed in the non-overlapping image region, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, performing second printing for forming a second print image based on image data having a single concentration, based on the color conversion table before correction and the first sharing ratio and the second sharing ratio after the correcting of at least either of the first sharing ratio and the second sharing ratio, in the overlapping image region and the non-overlapping image region, and correcting the color conversion table before correction based on the second print image to create another color conversion table used to convert color space data of image data corresponding to the overlapping image region into color space data of printing data corresponding to the overlapping image region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
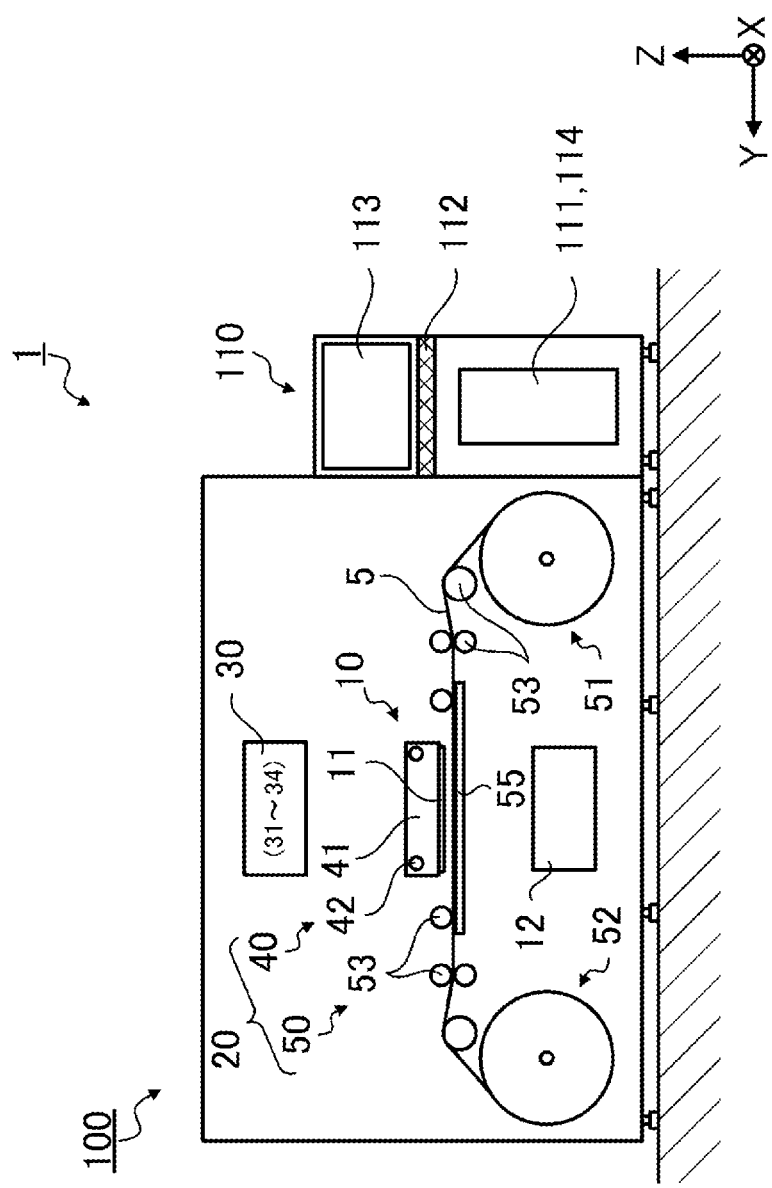
FIG. 1 is a front view illustrating a configuration of a printing system according to Exemplary Embodiment 1.

With reference to the drawings, description is given below of exemplary embodiments of the invention. The following is an exemplary embodiment of the invention and is not intended to limit the invention. Note that the respective drawings may not be illustrated to scale, for illustrative clarity. Also, as for coordinates given in the drawings, it is assumed that a Z-axis direction is an up/down direction, a +Z direction is an upward direction, an X-axis direction is a front/rear direction, a −X direction is a frontward direction, a Y-axis direction is a left/right direction, a +Y direction is a leftward direction, and an X-Y plane is a horizontal plane.

Exemplary Embodiment 1

Figure 2:
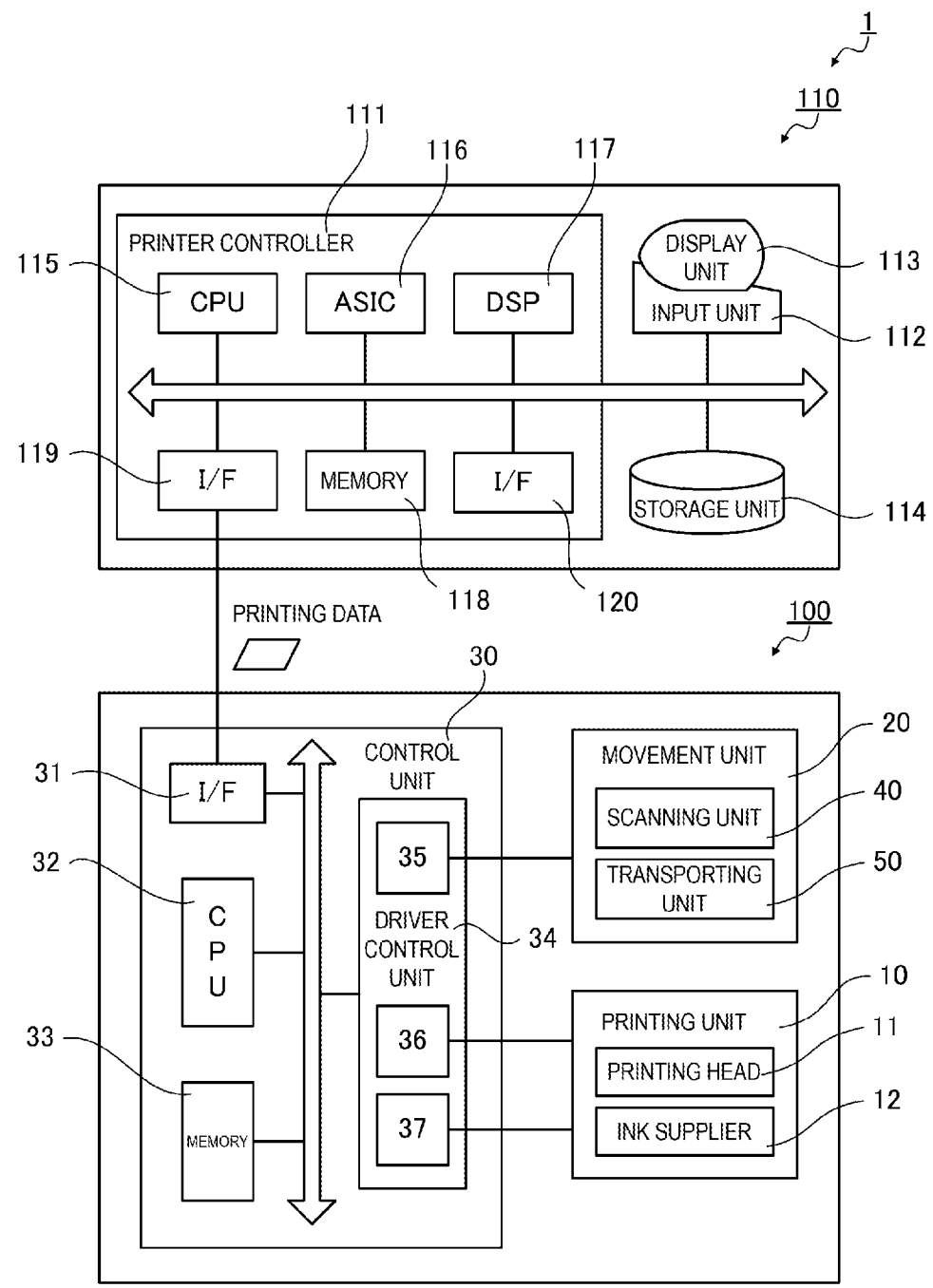
FIG. 2 is a block diagram illustrating the configuration of the printing system according to Exemplary Embodiment 1.

FIG. 1 is a front view illustrating a configuration of a printing system 1 according to Exemplary Embodiment 1, and FIG. 2 is a block diagram of the same.

The printing system 1 includes a printer 100 as a "printing apparatus" and an image processing device 110 connected to the printer 100. The printer 100 is an ink-jet serial printer that prints a desired image (print image) on a long-length printing medium 5 supplied in a roll shape, based on printing data received from the image processing device 110.

The printing medium 5 to be used may be wood-free paper, cast paper, art paper, coated paper, or synthetic paper, for example. The printing medium 5 is not limited to the papers described above. The printing medium 5 to be used may be a film formed of polyethylene terephthalate (PET), polypropylene (PP) or the like, for example.

Basic Configuration of Image Processing Device

The image processing device 110 includes a printer controller 111, an input unit 112, a display unit 113, a storage unit 114, and the like, and controls print jobs for printing to be performed by the printer 100. As a preferred example, the image processing device 110 is configured using a personal computer.

Software operated by the image processing device 110 includes general image processing application software (hereinafter referred to as an application) that deals with the image data to be printed, and printer driver software (hereinafter, referred to as a printer driver) that generates printing data for controlling the printer 100 and causing the printer 100 to execute printing.

Note that the printer driver is not limited to a configuration example as a functional unit using software but may also be configured using firmware, for example. The firmware is, for example, implemented on a system on chip (SOC) in the image processing device 110.

The image data to be printed here is data of an RGB color space, and includes, for example, general full color image information obtained by a digital camera or the like, text information, code information, and the like.

The image processing device 110 generates printing data used to cause the printer 100 to print a print image based on the image data.

The printing data is image formation data obtained by converting the image data so that the printer 100 can print the image data using the application and printer driver included in the image processing device 110, and includes a command for controlling the printer 100.

The printer controller 111 includes a Central Processing Unit (CPU) 115, an Application Specific Integrated Circuit (ASIC) 116, a Digital Signal Processor (DSP) 117, a memory 118, a printer interface 119, a multi-purpose interface 120, and the like, and performs centralized management of the entire printing system 1.

The input unit 112 is an information input means serving as a user interface. Specifically, the input unit 112 is, for example, a port or the like for connecting a keyboard, a mouse pointer, or an information input device.

The display unit 113 is an information display unit (display) as a user interface, and displays information input from the input unit 112, images to be printed on the printer 100, information related to a print job, and the like, under the control of the printer controller 111.

The storage unit 114 is a rewritable storage medium such as a hard disk drive (HDD) or a memory card, and stores software run by the image processing device 110 (programs run by the printer controller 111), an image to be printed, information about a print job, and the like.

The memory 118 is a storage medium that secures a region for storing programs run by the CPU 115, a work region for running such programs, and the like, and includes storage elements such as a RAM and an EEPROM.

The multi-purpose interface 120 is an interface capable of coupling an external electronic apparatus, such as a Local Area Network (LAN) interface or a Universal Serial Bus (USB) interface.

Basic Configuration of Printer 100

The printer 100 includes a printing unit 10, a movement unit 20, a control unit 30, and the like. The printer 100 that has received the printing data from the image processing device 110 controls the printing unit 10 and the movement unit 20 by the control unit 30 to print (form) an image on the printing medium 5.

The printing unit 10 includes a printing head 11, an ink supplier 12, and the like.

The movement unit 20 includes a scanning unit 40, a transporting unit 50, and the like. The scanning unit 40 includes a carriage 41, guide shafts 42, a carriage motor (not illustrated), and the like. The transporting unit 50 includes a supply unit 51, an accommodation unit 52, transport rollers 53, a platen 55, and the like.

The printing head 11 includes a plurality of nozzles (nozzle rows) for discharging printing liquids (hereinafter referred to as inks) as ink droplets (hereinafter referred to as ink droplets). The printing head 11 is mounted on the carriage 41, and moves back and forth in a scanning direction (the X-axis direction illustrated in FIG. 1) along with the carriage 41 that moves in the scanning direction. The printing head 11 discharges ink droplets onto the printing medium 5 supported by the platen 55 under the control of the control unit 30 while moving in the scanning direction, and thus rows of dots (raster lines) along the scanning direction are formed on the printing medium 5.

The ink supplier 12 includes ink tanks, and ink supply paths (not illustrated) that supply inks from the ink tanks to the printing head 11, and the like.

Examples of the inks include four ink sets obtained by adding black (K) to three ink sets including cyan (C), magenta (M), and yellow (Y), as ink sets of dark ink compositions. Examples of the inks also include eight ink sets obtained by adding ink sets of light ink compositions, such as light cyan (Lc), light magenta (Lm), light yellow (Ly), and light black (Lk), with reduced concentrations of the respective color materials. The ink tank, the ink supply path, and an ink supply route to the nozzles that discharge the same ink are provided separately for each ink.

As for a method of discharging ink droplets (ink-jet method), a piezo method is employed. The piezo method is a printing method, in which a pressure corresponding to a printing information signal is applied to the ink stored in a pressure chamber by a piezoelectric element (piezo element), and ink droplets are ejected (discharged) from a nozzle communicating with the pressure chamber.

Note that, the method for discharging ink droplets is not limited to this, and may be another printing method in which ink is ejected in a droplet shape to form a dot group on the printing medium. For example, the method for discharging ink droplets may be a method in which the ink is continuously ejected in a droplet shape from a nozzle at a strong electric field between the nozzle and an acceleration electrode placed in front of the nozzle, and a printing information signal is supplied from a deflection electrode while the ink droplets are flying, a method (electrostatic attraction method) for ejecting ink droplets in response to the printing information signal without deflection, a method in which the ink droplet is forcibly ejected by applying pressure to the ink by a small pump and mechanically vibrating the nozzle with a quartz oscillator and the like, and a method (thermal jet method) in which the ink is heated to be foamed by a micro electrode according to the printing information signal and the ink droplet is ejected to perform printing, and the like.

The movement unit 20 (the scanning unit 40 and the transporting unit 50) causes the printing medium 5 to relatively move with respect to the printing head 11 under the control of the control unit 30.

The guide shafts 42 extend in the scanning direction and support the carriage 41 in a slidable contact state. The carriage motor serves as a drive source to move the carriage 41 back and forth along the guide shafts 42. That is, the scanning unit 40 (the carriage 41, the guide shafts 42, and the carriage motor) causes the carriage 41 (that is, the printing head 11) to move in the scanning direction along the guide shafts 42 under the control of the control unit 30.

The supply unit 51 rotatably supports a reel on which the printing medium 5 is wound into a roll, and the supply unit 51 feeds the printing medium 5 into the transport path. The accommodation unit 52 rotatably supports a reel, on which the printing medium 5 is wound, and reels off the printing medium 5, on which printing is completed, from the transport path.

The transport rollers 53 include a driving roller that causes the printing medium 5 to move in a transport direction (the Y-axis direction illustrated in FIG. 1) intersecting with the scanning direction, a driven roller that rotates in accordance with the movement of the printing medium 5, and the like and constitute the transport path for transporting the printing medium 5 from the supply unit 51 to the accommodation unit 52 via a printing region (the area where the printing head 11 scans an upper surface of the platen 55) of the printing unit 10.

The control unit 30 includes an interface 31, a CPU 32, a memory 33, a driver control unit 34, and the like, and controls the printer 100.

The interface 31 is connected to the printer interface 119 of the image processing device 110 to transmit and receive data between the image processing device 110 and the printer 100. The image processing device 110 and the printer 100 may be connected directly with a cable or the like, or indirectly through a network or the like. Alternatively, the interface 31 may transmit and receive data between the image processing device 110 and the printer 100 through wireless communication.

The CPU 32 is an arithmetic processing unit for overall control of the printer 100.

The memory 33 is a storage medium that secures a region for storing programs run by the CPU 32, a work region for running such programs, and the like, and includes storage elements such as a RAM and an EEPROM.

The CPU 32 controls the printing unit 10 and the movement unit 20 through the driver control unit 34 according to the program stored in the memory 33 and the printing data received from the image processing device 110.

The driver control unit 34 controls driving of the printing unit 10 (the printing head 11 and the ink supplier 12) and the movement unit 20 (the scanning unit 40 and the transporting unit 50) based on the control of the CPU 32. The driver control unit 34 includes a movement control signal generation circuit 35, a discharge control signal generation circuit 36, and a drive signal generation circuit 37.

The movement control signal generating circuit 35 is a circuit that generates a signal for controlling the movement unit 20 (the scanning unit 40 and the transporting unit 50) according to an instruction from the CPU 32.

The discharge control signal generation circuit 36 is a circuit that generates a head control signal for selecting the nozzles for discharging the inks, selecting the amount to be discharged, controlling the discharge timing, and the like, based on the printing data in accordance with instructions from the CPU 32.

The drive signal generation circuit 37 is a circuit that generates a basic drive signal including a drive signal for driving piezoelectric elements of the printing head 11.

The driver control unit 34 selectively drives the piezoelectric elements corresponding to the respective nozzles based on the head control signal and the basic drive signal.

According to the configuration described above, the control unit 30 forms (prints) a print image based on image data on the printing medium 5 by repeating, with respect to the printing medium 5 supplied to the printing region by the transporting unit 50 (the supply unit 51 and the transport rollers 53), a pass movement for discharging (applying) ink droplets from the printing head 11 while moving the carriage 41 that supports the printing head 11 along the guide shafts 42 in the scanning direction (the X-axis direction), and a transport movement for moving the printing medium 5 in the transport direction (the +Y-axis direction) intersecting with the scanning direction by the transporting unit 50 (the transport rollers 53).

Flowchart of Image Processing of Generating Printing Data in Related Art

Figure 3:
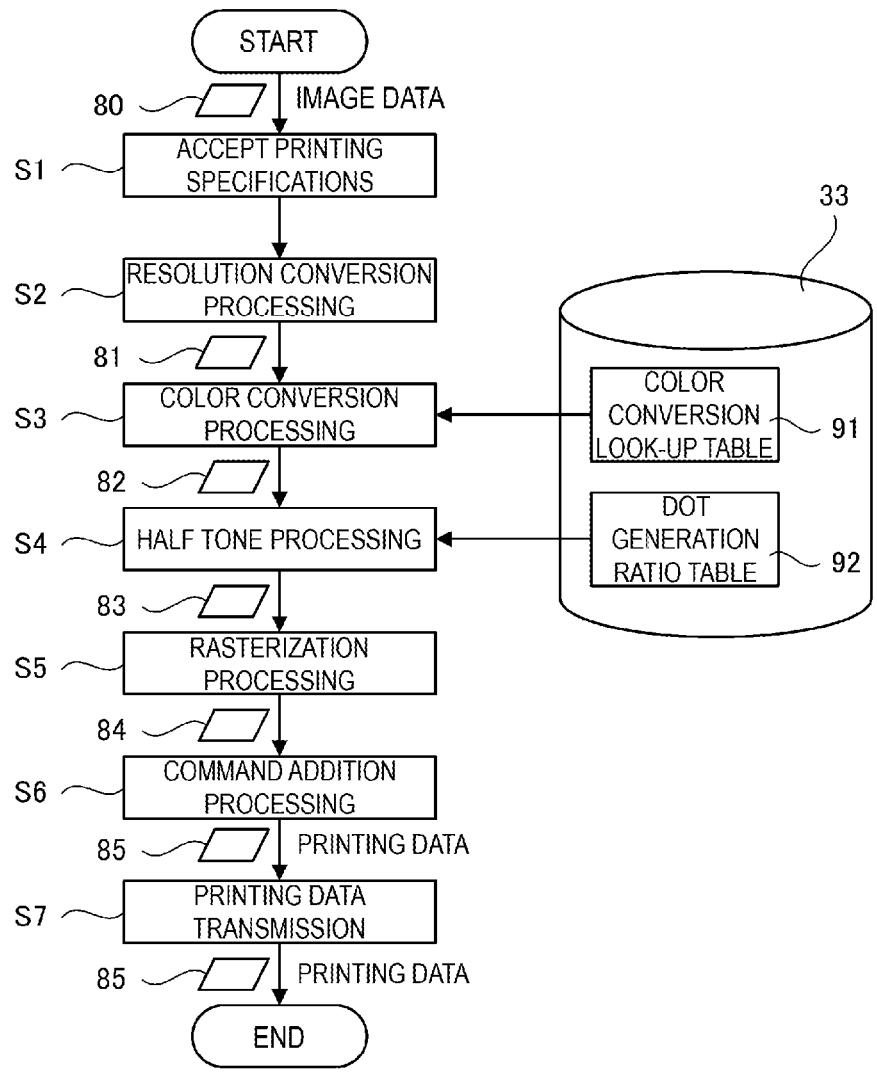
FIG. 3 is a flowchart illustrating image processing of generating printing data in the related art.

FIG. 3 is a flowchart illustrating a basic flow in the related art of image processing that generates printing data.

Printing on the printing medium 5 is started by transmitting printing data to the printer 100 from the image processing device 110. The printing data is generated by the printer driver.

For the conversion of the image data from the application into the printing data, the printer driver performs resolution conversion processing, color conversion processing, half tone processing, rasterization processing, command addition processing, and the like.

With reference to FIG. 3, description is given below of processing of generating recording data in the related art.

First, the printer driver acquires image data 80 as a print target, when implementing printing according to designation of a user and accepts designation of printing specifications (e.g., a printing medium, a printing size, and a printing mode) from the user (step S1).

Here, the printing mode is, for example, in a case where a print specification such as "fine", "high definition", or "fast" can be selected by the user when the printing is performed, a mode in which printing corresponding to each selection is executed. Printing modes in which the relative movement amounts of the sub scanning movements are different according to the respective selection (that is, the number of the pass movements forming an image is different), correspond to each selection.

Next, the printer driver performs the resolution conversion processing on the image data 80 (step S2).

The resolution conversion processing is processing of converting the image data 80 outputted from the application into a resolution for printing (printing resolution) on the printing medium 5. For example, when the printing resolution is specified as 720×720 dpi, the vector format image data 80 received from the application is converted into bit map format image data 81 having a 720×720 dpi resolution. Each pixel data in the image data 81 after the resolution conversion processing includes pixels arranged in a matrix pattern. Each pixel has a tone value in 256 tones, for example, in the RGB color space. That is, each piece of the pixel data after the resolution conversion shows the tone value of the corresponding pixel.

Among the pixels arranged in the matrix pattern, the pixel data corresponding to one row of pixels aligned in a predetermined direction is called raster data. Note that the predetermined direction in which the pixels corresponding to the raster data are aligned corresponds to the direction (the scanning direction) in which the printing head 11 moves when printing an image.

Next, the printer driver performs the color conversion processing of the image data 81 (step S3).

The color conversion processing is a processess of converting RGB data into data of a CMYK color space. CMYK refers to cyan (C), magenta (M), yellow (Y), and black (K). The image data of the CMYK color space is data corresponding to the colors of the inks of the printer 100. Therefore, when the printer 100 uses ten types of ink of the CMYK color system, the printer driver generates image data in a ten-dimensional space of the CMYK color system based on the RGB data. This color conversion processing is performed based on a color conversion look-up table 91 serving as a "color conversion table" in which the tone values of the RGB data and the tone values of the CMYK color system data are associated with each other. Note that the pixel data after the color conversion processing is the CMYK color system data of 256 tones, for example, expressed in the CMYK color space. After having undergone the color conversion processing, image data 82 based on the CMYK color space is generated from the image data 81 based on the RGB color space.

The color conversion look-up table 91 is generated for each individual unit in a production factory of the printer 100, and is stored as initial data in the memory 33 (for example, a non-volatile storage medium such as an EEPROM) at the time of shipment. The printer driver reads, when printing data is generated, the color conversion look-up table 91 from the printer 100 to perform the color conversion processing.

Next, the printer driver performs the half tone processing on the image data 82 (step S4).

The half tone processing is a process of converting data of a high number of tones (256 tones) into data of a number of tones that can be formed by the printer 100. Through this half tone processing, data expressing 256 tones, for example, is converted into 1-bit data expressing two tones (dot and no dot) and 2-bit data expressing four tones (no dot, small dot, medium dot, and large dot). Specifically, a dot generation ratio corresponding to the tone value (in the case of four tones, a generation ratio of each of no dot, small dot, medium dot, and large dot, for example) is obtained from a dot generation ratio table 92 in which the tone values (0 to 255) and dot generation ratios are associated with each other. Then, with the generation ratio thus obtained, pixel data (image data 83) is created so that dots are formed in a distributed manner, by using a dither method, an error diffusion method, or the like.

The dot generation ratio table 92 is prepared for each individual of the printer 100 in the production factory, and stored in the memory 33 (for example, a non-volatile storage medium such as an EEPROM) as initial data before shipment. The printer driver reads, when printing data is generated, the dot generation ratio table 92 from the printer 100 to perform the half tone processing.

Next, the printer driver performs the rasterization processing on the image data 83 (step S5).

The rasterization processing is processing of rearranging the pixel data (for example, the 1-bit or 2-bit data as described above) in the matrix pattern, according to a dot formation order for printing. The rasterization processing includes allocation processing of allocating the image data 83 including the pixel data after the half tone processing to each pass operation in which the printing head 11 (nozzle rows) discharges ink droplets while moving in the scanning direction. Once the allocation processing is completed, the pixel data in the matrix pattern becomes data (image data 84) allocated to the actual nozzles that form respective raster lines constituting the printing image.

Next, the printer driver performs the command addition processing on the image data 84 (step S6).

The command addition processing is a process of adding command data corresponding to a printing method, to the rasterized data. The command data includes, for example, transport data related to transport specifications (a movement amount in the transport direction, a speed, and the like) of the printing medium 5, and the like.

By the command addition processing, printing data 85 for causing the printer 100 to execute printing is generated, and the generated printing data 85 is transmitted to the printer 100 to start printing (step S7).

Such processing by the printer driver is performed by the ASIC 116 and the DSP 117 (refer to FIG. 2) under the control of the CPU 115. Then, the generated printing data is transmitted by printing data transmission processing to the printer 100 through the printer interface 119.

Nozzle Rows

Figure 4:
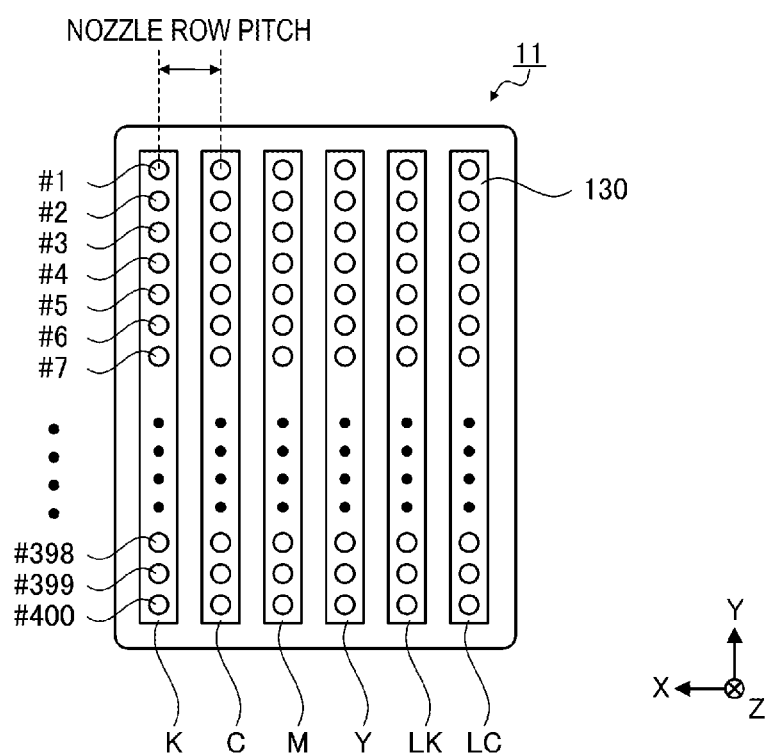
FIG. 4 is a schematic diagram illustrating an example of arrangement of nozzles when viewed from a lower surface of a printing head.

FIG. 4 is a schematic diagram illustrating an example of arrangement of the nozzles when viewed from a lower surface of the printing head 11.

As illustrated in FIG. 4, the printing head 11 includes nozzle rows 130 in which the plurality of nozzles for discharging the ink of each color are arranged in lines (in the example illustrated in FIG. 4, a black ink nozzle row K, a cyan ink nozzle row C, a magenta ink nozzle row M, a yellow ink nozzle row Y, a gray ink nozzle row LK, and a light cyan ink nozzle row LC each including 400 nozzles of #1 to #400).

The plurality of nozzles of each of the nozzle rows 130 are aligned and lined up at a constant interval (nozzle pitch) along the transport direction (the Y-axis direction) respectively. Further, the plurality of nozzle rows 130 are aligned and lined up to be parallel to each other at a constant interval (nozzle row pitch) along a direction (the X-axis direction) intersecting with the transport direction. In FIG. 4, the nozzles of each of the nozzle rows 130 are assigned with a smaller number as the nozzle arranged on the downstream side (#1 to #400). That is, the nozzle #1 is located on the downstream side of the nozzle #400 in the transport direction. Each of the nozzles is provided with a driving element (piezoelectric element such as a piezo element described above) for driving each of the nozzles to discharge ink droplets.

Suppressing Banding in Related Art

Figure 5:
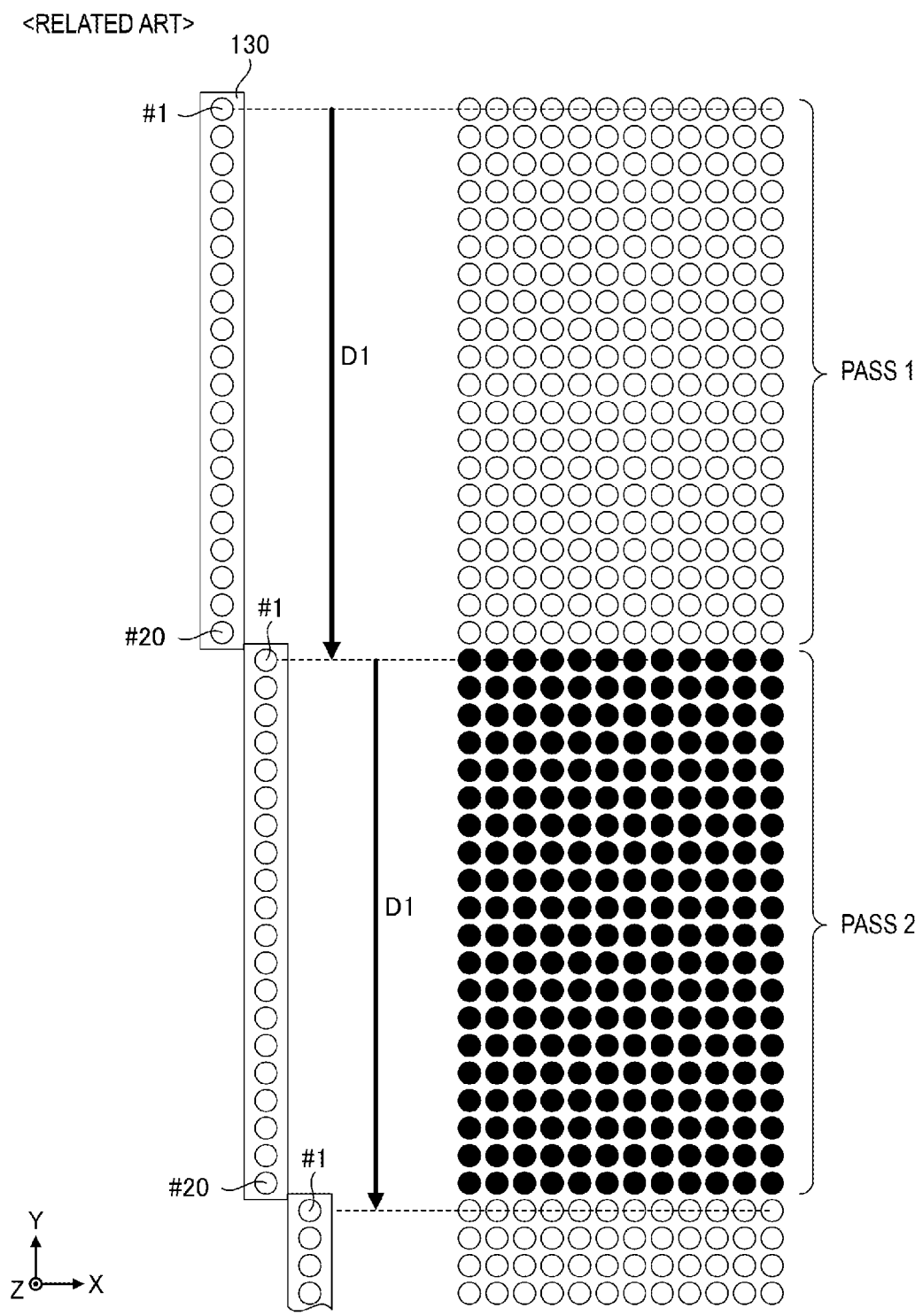
FIG. 5 is an explanatory view illustrating an example of band printing in the related art.

FIG. 5 is an explanatory view illustrating an example of band printing in the related art, illustrating a relationship between relative positions of the nozzle rows 130 configuring the printing head 11 and positions of dots formed through pass operations along movements of the printing medium 5 in the transport direction (the +Y direction). FIG. 5 illustrates one of the nozzle rows 130 for ease of description. In the one of the nozzle rows 130, a nozzle count n=20. D1 illustrated in FIG. 5 denotes a sub scanning feeding amount representing a feeding amount during a pass operation.

In FIG. 5, relative positions of the one of the nozzle rows 130 through step movements of the printing medium 5 per the sub scanning feeding amount D1 by the transporting unit 50 are illustrated diagonally so that the nozzle rows 130 do not overlap one another. That is, although FIG. 5 illustrates as if the one of the nozzle rows 130 moves in a −Y direction, the printing medium 5 actually moves in the +Y direction. There is no meaning in a positional relationship of the nozzle rows 130 in the X-axis direction.

In the description below, a single pass operation (hereinafter sometimes simply referred to as a pass) for causing the nozzle rows 130 to move in the scanning direction, to discharge the inks, and to form dots denotes forming the dots along a single movement in the scanning direction. By combining, in the Y-axis direction, each partial image to be printed through forming of dots along a single movement in the scanning direction, a print image based on image data is printed.

In the exemplary embodiment, a first nozzle group and a second nozzle group described later respectively correspond to the nozzle rows 130. Some of the nozzle rows 130 are configured to first perform a pass operation, and are included in the first nozzle group. The other of the nozzle rows 130 are configured to then perform a next pass operation, and are included in the second nozzle group.

As illustrated in FIG. 5, when the sub scanning feeding amount D1 is specified as an amount corresponding to a width (a length in the Y-axis direction) of a partial image to be formed through a single pass operation, and when, each time the nozzle rows 130 perform the single pass operation, sub scanning at the sub scanning feeding amount D1 is performed, partial images to be printed through the pass operations do not overlap with each other, achieving efficient printing. However, in the method, due to accuracy when the printing medium 5 is fed in the Y-axis direction, as well as shifts in landing position of ink droplets to be discharged from the nozzles between bands (between partial images), for example, dot gaps may expand in boundaries of the bands (partial images), leading to white lines (light lines), whereas dot gaps may become dense, leading to black lines (strong lines).

Figure 6:
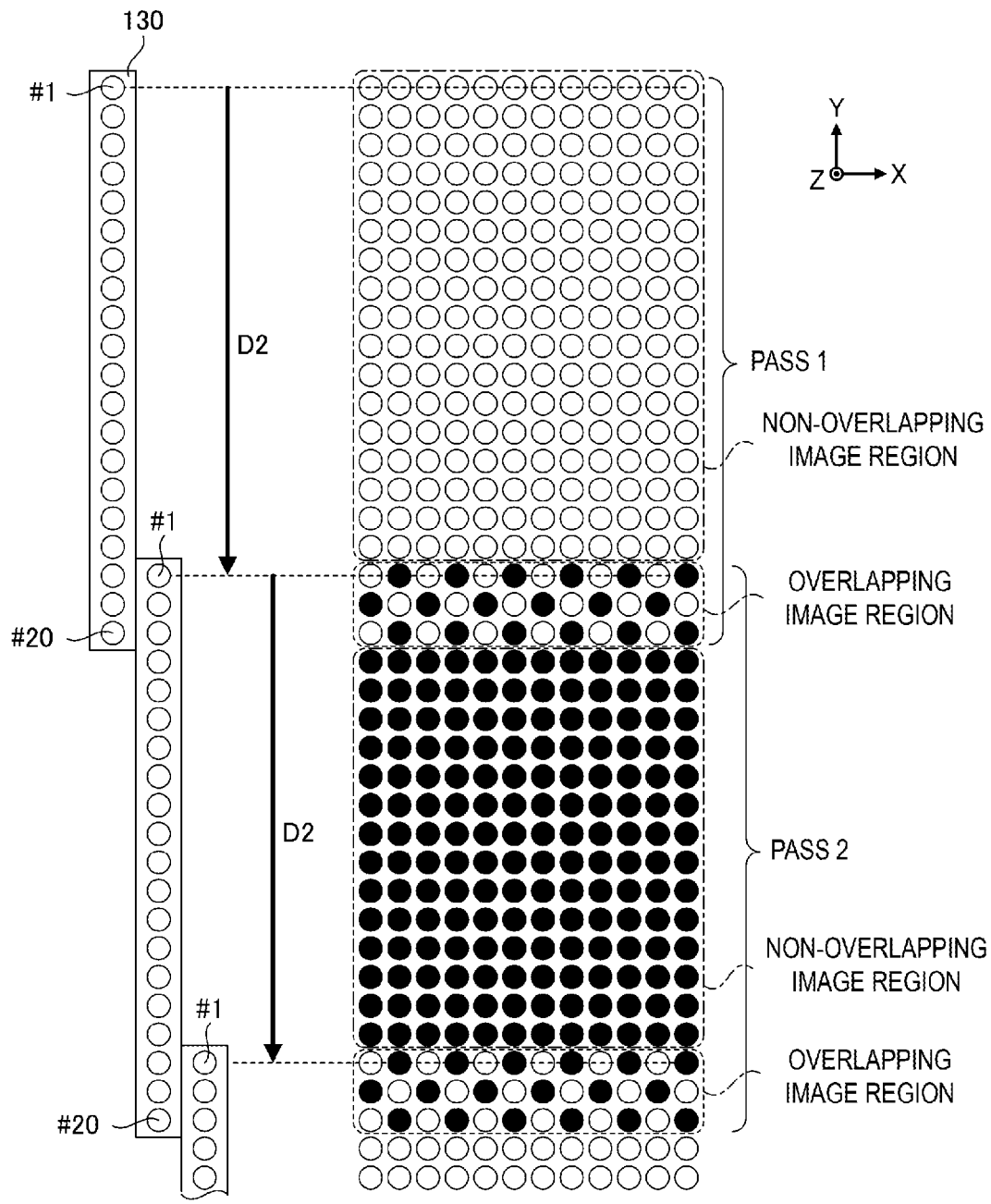
FIG. 6 is an explanatory view illustrating a method of printing in an overlapped manner partial regions around a band boundary.

To suppress banding due to strong and light lines, as described above, such a method (partial overlapping (POL) printing) is available that partial regions around band boundaries are respectively separately printed in an overlapped manner through band printing (pass operations). FIG. 6 is an explanatory view illustrating an example of the method. White circles denote dots formed through a pass 1 (and a pass 3), whereas black circles denote dots formed through a pass 2.

In the example illustrated in FIG. 6, a sub scanning feeding amount is specified as D2 representing an amount shorter by an amount equivalent to three dot rows than the amount represented by D1 so that partial images to be formed through pass operations overlap with each other by an amount equivalent to three dot rows. In regions (hereinafter sometimes referred to as overlapping image regions) where partial images to be formed through pass operations join and overlap with each other, dots to be formed separately through pass operations are alternately arranged, as illustrated in FIG. 6. That is, a first sharing ratio at which the first nozzle group shares positions of dots to be formed in an overlapping image region and a second sharing ratio at which the second nozzle group shares positions of dots to be formed are each specified as 50% so that dots based on printing data are formed at the positions of dots to be formed at a ratio of 100% through two pass operations. Note that a sharing ratio denotes a ratio of an area shared by nozzles in an overlapping image region. The first sharing ratio of 50% means that the first nozzle group form dots in an area of 50% in an overlapping image region.

The method allows boundaries of bands to be dispersed, suppressing banding due to strong and light lines described above from occurring. However, depending on a printing environment and a specification of the printing medium 5, for example, a timing of discharging ink droplets onto a single region is separated into two, i.e., a pass 1 and a pass 2 (a time difference occurs). In this case, the overlapping image region may become slightly thinner than other regions, which is observed as uneven concentration. A possible reason for this is that, after ink droplets applied through the pass 1 are dried to a certain degree, ink droplets are applied through the pass 2, and thus, areas where inks wet-spread through the pass 2 are reduced, compared with a case when ink droplets are applied wholly through a single pass, reducing a size of dots to be formed.

Even with shifts of dots formed through the pass 2 from predetermined positions with respect to positions of dots formed through the pass 1, an overlapping image region may be caused to be slightly thinner than other regions, which is observed as uneven concentration. A possible reason for this is that shifts of dots in relative position cause regions where no dot is applied in a printing medium to expand.

In response to this, by performing a correction so that a concentration (a tone value) in an overlapping image region becomes further dense (performing a correction to increase densities of inks to be applied), such uneven concentration can be suppressed from occurring. However, banding observed due to a color difference occurring in an overlapping image region (a color difference occurring when printing is separately performed through two passes or a color difference occurring when a correction is performed such that a concentration (a tone value) becomes dense) might not be reduced.

Suppressing Banding in Exemplary Embodiment

An image processing method (image processing method configured to generate printing data) according to the exemplary embodiment includes correcting, in accordance with a degree of reduction in a dot coverage below a predetermined dot coverage in an overlapping image region that undergoes printing by the first nozzle group (some of the nozzle rows 130, which are configured to first perform a pass operation) and the second nozzle group (the other of the nozzle rows 130, which are configured to then perform a next pass operation), at least either of a first sharing ratio for the first nozzle group sharing positions of dots to be formed in the overlapping image region and a second sharing ratio for the second nozzle group sharing positions of dots to be formed in the overlapping image region to allow a total ratio of the first sharing ratio and the second sharing ratio to exceed 100%, and correcting a color conversion table (the color conversion look-up table 91) used to convert color space data of image data corresponding to the overlapping image region into color space data of printing data (color conversion table correction step) to correct colors of a print image of the overlapping image region printed based on the first sharing ratio and the second sharing ratio after the correcting of at least either of the first sharing ratio and the second sharing ratio, so that the fine print image in which a concentration (a tone value) and a color difference in the overlapping image region are both corrected can be acquired.

Note that a dot coverage denotes an area ratio of how much, when ink droplets are discharged and land to form dots on the printing medium 5, the dots cover a surface of the printing medium 5. That is, the higher the dot coverage, the higher the concentration in a print image to be observed, whereas the lower the dot coverage and the higher the ratio at which the surface of the printing medium 5 is observed (e.g., white surface), the lower the concentration in a print image to be observed. The predetermined dot coverage denotes a dot coverage when ink droplets, in a predetermined size, are discharged and land at predetermined positions wet-spread in a predetermined shape to form dots. In a case where ink droplets land at different positions, and some dots are formed overlapped partially or wholly, for example, a dot coverage therefore reduces, compared with the predetermined dot coverage, reducing a concentration in a print image to be observed.

Figure 7:
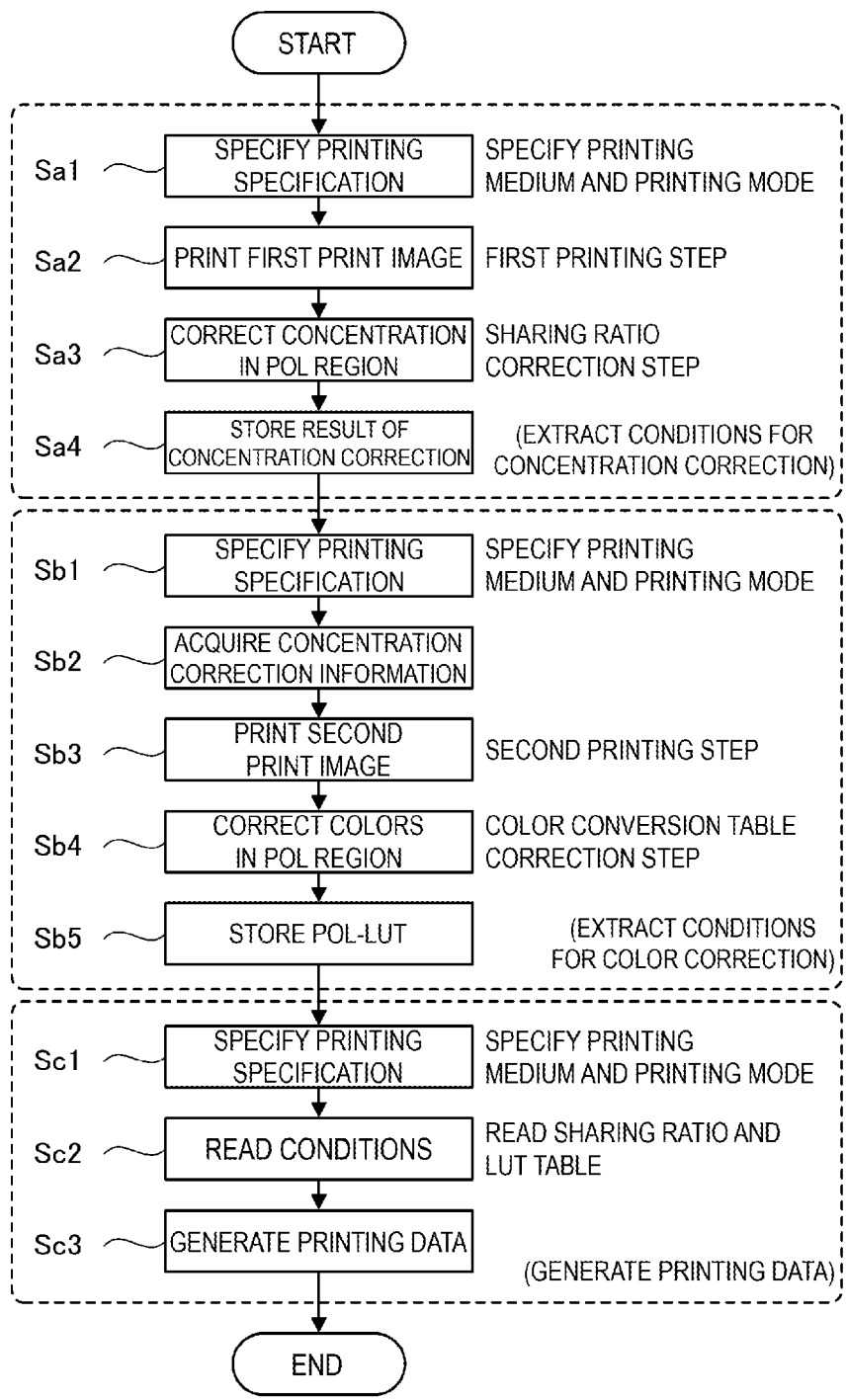
FIG. 7 is a flowchart illustrating a series of an image processing method according to an exemplary embodiment.

FIG. 7 is a flowchart illustrating a series of an image processing method according to the exemplary embodiment.

The image processing method according to the exemplary embodiment will be described with reference to FIG. 7.

The image processing method configured to generate printing data, according to the exemplary embodiment, includes steps Sa1 to Sa4, in which conditions for correcting a concentration in an overlapping image region are extracted per a type of the printing medium 5 and a printing mode in the production factory of the printer 100, steps Sb1 to Sb5, in which, similarly, conditions for a color correction to be performed to color-convert appropriately an image having undergone a concentration correction in the overlapping image region are extracted per the type of the printing medium 5 and the printing mode in the production factory of the printer 100, and, by allowing a user to specify a type of the printing medium 5 and a printing mode for printing, generating printing data in accordance with the corresponding conditions set in the production factory of the printer 100. The series of steps are performed via the image processing device 110 coupled to the printer 100.

Steps Sa1 to Sa4, in which conditions for correcting a concentration in an overlapping image region are extracted per a type of the printing medium 5 and a printing mode, and steps Sb1 to Sb5, in which conditions for a color correction to be performed to color-convert appropriately an image having undergone a concentration correction in the overlapping image region are extracted per the type of the printing medium 5 and the printing mode, may not be always performed in the production factory of the printer 100. A user of the printing system 1 may perform the steps.

First, in the production factory of the printer 100, before extracting conditions for correcting a concentration in an overlapping image region, printing specifications (types of the printing medium 5 and printing modes) are specified (step Sa1). Reasons for this are that, depending on a printing mode, relative movement amounts of the printing head 11 and the printing medium 5 differ from each other in a sub scanning operation, i.e., a configuration of an overlapping image region differs, and that, depending on a type of the printing medium 5, a required degree of a concentration correction in the overlapping image region differs.

Next, to the specified printing medium 5, with the specified printing mode, based on the color conversion look-up table 91 before correction, described later, a first print image is formed based on image data having a single concentration in an overlapping image region that undergoes printing by the first nozzle group and the second nozzle group and a non-overlapping image region that undergoes printing by the first nozzle group or the second nozzle group (step Sa2 (first printing step)).

Image data having a single concentration denotes image data used to print a single print image (first print image) in a non-overlapping image region and an overlapping image region, respectively, so as to easily know a degree of reduction in a dot coverage in the first print image formed in the overlapping image region relative to a dot coverage in the first print image formed in the non-overlapping image region. Preferable image data is, for example, image data of a solid image (an image with a filling ratio of 100% in a dot matrix) allowing a simple comparison of a dot coverage between respective image regions. Specifically, a solid pattern including a non-overlapping image region and an overlapping image region, where ink colors each have a maximum concentration, as illustrated in FIG. 6, for example, is printed as the first print image.

Next, in accordance with a degree of reduction in a dot coverage in the first print image formed in the overlapping image region relative to a dot coverage in the first print image formed in the non-overlapping image region, at least either of a first sharing ratio for the first nozzle group sharing positions of dots to be formed in the overlapping image region and a second sharing ratio for the second nozzle group sharing positions of dots to be formed in the overlapping image region is corrected to allow a total ratio of the first sharing ratio and the second sharing ratio to exceed 100% (step Sa3 (sharing ratio correction step)).

Specifically, in the first print image having the solid pattern as illustrated in FIG. 6, for example, for banding where a printing concentration in the overlapping image region is observed thinner, a correction is performed so as to raise at least either of the first sharing ratio (a ratio at which the first nozzle group (the pass 1) shares positions of dots to be formed) that is 50% in the overlapping image region and the second sharing ratio (a ratio at which the second nozzle group (the pass 2) shares positions of dots to be formed) that is 50%.

A correction for raising a sharing ratio is performed in the allocation processing configured to perform allocations to passes during the rasterization processing configured to rearrange the image data 83 arranged in a matrix after having undergone the half tone processing (see FIG. 3) in a dot formation order for printing. When a total ratio of the first sharing ratio and the second sharing ratio is equal to or below 100%, positions of dots to be formed in each pass are exclusive from each other. However, when a total ratio of the first sharing ratio and the second sharing ratio exceeds 100% through a correction in step Sa3 (sharing ratio correction step), positions of dots to be formed in an overlapped manner are allocated at random in an overlapping image region.

For example, the first sharing ratio and the second sharing ratio are specified, respectively, as 60%. In this case, a density of ink droplets to be discharged in an overlapping image region reaches 120% in a case of a solid pattern. For example, when all ink droplets land at ideal positions, printing takes place such that some dots are formed overlapped at positions at a density of 20%. Compared with a case where there is no overlapping, the ink droplets that land at overlapped positions wet-spread in wider areas, forming larger dots. That is, when a total value of the first sharing ratio and the second sharing ratio exceeds 100%, a dot coverage rises, increasing a printing concentration. This tendency can be also observed when ink droplets land at varied positions.

How much either or both of the first sharing ratio and the second sharing ratio is or are increased is adjusted repeatedly until a print image that can be determined as acceptable is acquired while performing the allocation processing with the once set first and second sharing ratios, generating printing data, and checking a print image printed based on the printing data. It is preferable to determine whether either of the first sharing ratio and the second sharing ratio should be increased, or whether both of the first sharing ratio and the second sharing ratio should be kept identical to each other, for example, based upon performing an appropriate, full evaluation, because how quickly an ink penetrates or dries differs, and, accordingly, a degree of effect differs depending on a specification of the printing medium 5 and an ink, for example.

A functional unit included in the image processing device 110 may correct either (or both) of the first sharing ratio and the second sharing ratio. The functional unit denotes a unit configured to achieve a predetermined function with software (or firmware) to be executed by the image processing device 110. Specifically, the functional unit is configured to derive how much a sharing ratio is to be increased, and to perform a correction based on information about a degree of reduction in dot coverage in an overlapping image region and a difference in concentration between a non-overlapping image region and the overlapping image region. A degree of reduction in dot coverage in an overlapping image region and a difference in concentration between a non-overlapping image region and an overlapping image region can be acquired by scanning a first print image with a scanner and allowing the scanned first print image to undergo image processing, for example.

The functional unit configured to correct either or both of the first sharing ratio and the second sharing ratio based on entered information about a degree of reduction in dot coverage in an overlapping image region and a difference in concentration between a non-overlapping image region and the overlapping image region represents the "sharing ratio correction unit" in the exemplary embodiment.

It is preferable that, when the image processing device 110 includes the sharing ratio correction unit as the functional unit, a user interface configured to allow at least either of the first sharing ratio and the second sharing ratio to be changed is included so as to make available to a user of the printing system 1 a function capable of further correcting either or both of the first sharing ratio and the second sharing ratio. The user interface includes, as hardware, the input unit 112 and the display unit 113, and also includes, as software, a program to be executed by the printer controller 111.

Steps Sa1 to Sa3 are repeated for all the printing specifications (the types of the printing medium 5 and the printing modes) required to be prepared beforehand. Acquired conditions for correction (a correction value (a result of a concentration correction) for either or both of the first sharing ratio and the second sharing ratio) are then stored, per printing specification, in the memory 33 (e.g., a non-volatile storage medium such as an EEPROM) (step Sa4).

Next, in step Sb1 to Sb5, in which conditions for a color correction are to be extracted, a color conversion table (a color conversion look-up table 91r) used to correct colors of a print image of the overlapping image region is created per printing specification (the types of the printing medium 5 and the printing modes). The color conversion look-up table 91r is acquired by correcting the color conversion look-up table 91 (color conversion table correction step).

First, the printing specifications (the types of the printing medium 5 and the printing modes) are specified (step Sb1) to acquire concentration correction information in the overlapping image region, which corresponds to the specified printing specifications (information about the first sharing ratio and the second sharing ratio, at least either of which is corrected in the correcting of a sharing ratio (step Sa3)) (step Sb2).

Next, based on the color conversion look-up table 91 and the acquired first and second sharing ratios, a second print image based on image data having a single concentration is formed in the overlapping image region and the non-overlapping image region (step Sb3 (second printing step)). Specifically, image data corresponding to the second print image is converted into printing data based on a printing specification, the color conversion look-up table 91 corresponding to the printing specifications, and the first and second sharing ratio, for example to print the second print image.

Image data having a single concentration as referred here denotes image data used to print a single print image (second print image) in a non-overlapping image region and an overlapping image region, respectively, so as to easily know how much colors of the second print image to be formed in the overlapping image region differ from colors of the second print image to be formed in the non-overlapping image region. Preferable image data is, for example, image data of a solid image (an image with a filling ratio of 100% in a dot matrix) allowing a simple comparison of a color difference between respective image regions. Specifically, a solid pattern including a non-overlapping image region and an overlapping image region, where predetermined colors or ink colors each have a predetermined concentration or a maximum concentration, as illustrated in FIG. 6, for example, is printed as the second print image.

Next, the color conversion look-up table 91 before correction is corrected based on the second print image to create a color conversion table (the color conversion look-up table 91r) used to convert color space data of image data corresponding to the overlapping image region into color space data of printing data corresponding to the overlapping image region (step Sb4 (color conversion table correction step)).

Specifically, for example, the color conversion look-up table 91r is acquired by correcting the color conversion look-up table 91 so that, in banding in which a color difference in the overlapping image region is observed in the second print image having the solid pattern, as illustrated in FIG. 6, the color difference to be recognized lowers.

Figure 8:
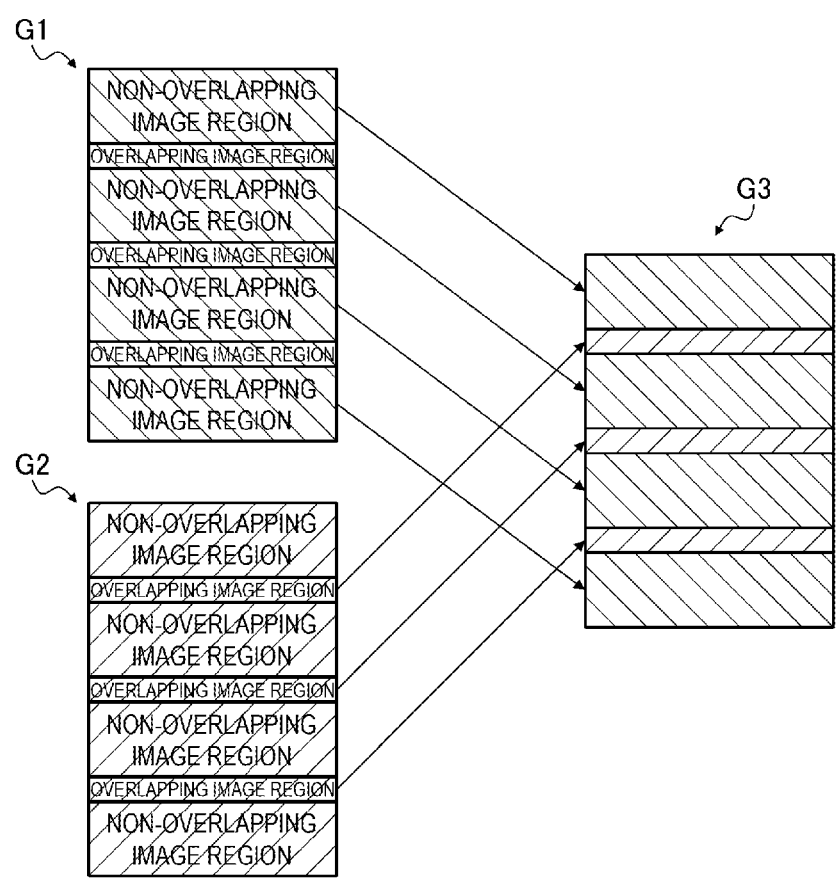
FIG. 8 is a conceptual diagram illustrating a method of forming a print image having undergone a color correction.

FIG. 8 is a conceptual diagram illustrating a method of forming a print image including an overlapping image region having undergone a color correction.

As the stage of the color conversion processing using the color conversion look-up table 91r acquired by performing a correction lies before the stage of performing pass-allocating (rasterization processing) (before an overlapping image region is determined) (see FIG. 3), the color conversion processing cannot be performed by applying the color conversion look-up table 91r to an overlapping image region only. Therefore, as illustrated in FIG. 8, image data is allowed to undergo the color conversion processing and the pass-allocating by using the color conversion look-up table 91 before correction to once generate image data G1, and the image data is also allowed to undergo the color conversion processing and the pass-allocating by using the color conversion look-up table 91r acquired by performing a correction to then generate image data G2. Next, a non-overlapping image region in the image data G1 and an overlapping image region in the image data G2 are combined to generate image data G3. By generating printing data based on the image data G3, a print image of the overlapping image region, which has undergone a color correction, can be acquired.

Whether a degree of color correction is acceptable or not is determined by checking a print image acquired as described above. Specifically, while checking a print image of the overlapping image region, which has undergone a color correction (a print image of printing data generated based on the image data G3), whether a color difference between the print image of the non-overlapping image region and the print image of the overlapping image region is fully suppressed is determined. Adjustments are repeated until a print image that can be determined as acceptable, where a color difference is fully suppressed, is acquired. Adjustments may otherwise be performed while colors of a print image are measured with a color measuring device, and a difference in color between an overlapping image region and a non-overlapping image region is quantified.

That is, in the correcting of colors, colors of a print image of an overlapping image region are corrected based on a print image of a non-overlapping image region (a print image of a non-overlapping image region, which is printed based on the image data G1).

A functional unit included in the image processing device 110 may perform a color correction (a correction by correcting colors of a print image of an overlapping image region with a color conversion table (the color conversion look-up table 91)). Specifically, the functional unit is configured to correct a color conversion table based on information about a color difference between an overlapping image region and a non-overlapping image region (the color conversion look-up table 91 is corrected to create the color conversion look-up table 91r). Information about a color difference between an overlapping image region and a non-overlapping image region can be acquired by utilizing a color measuring device, for example. The functional unit configured to create the color conversion look-up table 91r by correcting the color conversion look-up table 91 based on information about a color difference between an overlapping image region and a non-overlapping image region represents the "color correction unit" in the exemplary embodiment.

It is preferable that, when the image processing device 110 includes the color correction unit as the functional unit, a user interface configured to allow a degree of correction to be set when the color conversion look-up table 91 is corrected to create the color conversion look-up table 91r is included so as to make available to a user of the printing system 1 the color correction function capable of further suppressing a color difference between an overlapping image region and a non-overlapping image region. The user interface includes, as hardware, the input unit 112 and the display unit 113, and also includes, as software, a program to be executed by the printer controller 111.

Steps Sb1 to Sb4 are repeated for all printing specifications (the types of the printing medium 5 and the printing modes) required to be prepared beforehand. The acquired color conversion look-up table 91r is then stored, per printing specification, in the memory 33 (e.g., a non-volatile storage medium such as an EEPROM) (step Sb5).

The method of creating the color conversion look-up table 91r described so far, i.e., steps Sa1 to Sa4, in which conditions for correcting a concentration in an overlapping image region are extracted, and steps Sb1 to Sb5, in which conditions for a color correction to be performed to color-convert appropriately an image having undergone a concentration correction in the overlapping image region are extracted, represents the "color conversion table creation method" in the exemplary embodiment.

Next, in steps Sc1 to Sc3, in which printing data is to be generated, the concentration correction information about the corresponding overlapping image region, which is stored per printing specification (a type of the printing medium 5 and a printing mode) (the information about the first sharing ratio and the second sharing ratio, at least either of which is corrected in the correcting of a sharing ratio (step Sa3)), and the color conversion look-up table 91r are read to generate printing data based on the information and the table.

First, a printing specification (a type of the printing medium 5 and a printing mode) is specified (step Sc1) to acquire concentration correction information in the overlapping image region, which corresponds to the specified printing specification (information about the first sharing ratio and the second sharing ratio, at least either of which is corrected in the correcting of a sharing ratio (step Sa3)), and the color conversion look-up table 91r (step Sc2).

Next, as illustrated in FIG. 8, based on the color conversion look-up table 91, the first sharing ratio, and the second sharing ratio, the image data G1 is generated, whereas, based on the color conversion look-up table 91r, the first sharing ratio, and the second sharing ratio, the image data G2 is generated. Next, the image data G3 is generated based on the image data G1 and the image data G2. The image data G3 is allowed to further undergo the command addition processing (see FIG. 3) to generate printing data (step Sc3).

As described above, the image processing method, the color conversion table creation method, the image processing device, and the printing system according to the exemplary embodiment can achieve the following effects.

In accordance with a degree of reduction in a dot coverage below a predetermined dot coverage in an overlapping image region that undergoes printing by the first nozzle group (some of the nozzle rows 130, which are configured to first perform a pass operation) and the second nozzle group (the other of the nozzle rows 130, which are configured to then perform a next pass operation), at least either of a first sharing ratio for the first nozzle group sharing positions of dots to be formed in the overlapping image region and a second sharing ratio for the second nozzle group sharing positions of dots to be formed in the overlapping image region is corrected to allow a total ratio of the first sharing ratio and the second sharing ratio to exceed 100%. That is, by performing a correction so that the greater the degree of reduction in concentration in a print image due to a reduction in dot coverage in an overlapping image region, the greater the total value of the first sharing ratio and the second sharing ratio, ink droplets landing in the overlapping image region increase, further expanding areas (dot areas) on a surface of a printing medium in which ink droplets wet-spread. As a result, in accordance with a degree of reduction in dot coverage in an overlapping image region, a subsequent reduction in concentration in a print image can be suppressed (corrected).

When a print image of an overlapping image region is to be printed based on the first sharing ratio and the second sharing ratio after at least either of the first sharing ratio and the second sharing ratio is corrected in the correcting of a sharing ratio, colors of the print image are corrected by correcting a color conversion table used to convert color space data of image data corresponding to the overlapping image region into color space data of printing data. That is, since a color conversion table is corrected as premises for a correction of a concentration in a print image of an overlapping image region in the correcting of a sharing ratio, a fine print image where both of a concentration and a color difference in a print image are corrected can be acquired.

In the correcting of colors, colors of a print image of an overlapping image region are corrected based on a print image of a non-overlapping image region. By correcting colors of a print image of an overlapping image region in accordance with a print image of a non-overlapping image region, banding due to a color difference between a print image of a non-overlapping image region and a print image of an overlapping image region can be suppressed.

When the image processing device 110 includes the sharing ratio correction unit and the color correction unit described above, similar effects can be further efficiently acquired.

When the printing system 1 includes the printer 100 and the image processing device 110 according to the exemplary embodiment, fine printing can be performed, where both of a concentration and a color difference are corrected with respect to banding that occurs in an overlapping image region.

When the image processing device 110 includes the sharing ratio correction unit as the functional unit and a user interface configured to allow at least either of the first sharing ratio and the second sharing ratio corrected by the sharing ratio correction unit to be changed, a user can further adjust, before performing printing, how much a degree of reduction in concentration in a print image accompanying a reduction in dot coverage in an overlapping image region can be suppressed (corrected).

When the image processing device 110 includes the color correction unit as the functional unit and a user interface configured to allow a degree of correction to be set when the color conversion look-up table 91r is created by correcting the color conversion look-up table 91, the user can further correct, before performing printing, colors of a print image of an overlapping image region when the print image is to be printed based on the first sharing ratio and the second sharing ratio after the correcting of at least either of the first sharing ratio and the second sharing ratio by the sharing ratio correction unit.

Exemplary Embodiment 2

Next, an image processing method, a color conversion table creation method, an image processing device, and a printing system according to Exemplary Embodiment 2 will be described. Note that, the same constituents as those in the exemplary embodiment described above are given the same reference signs, and redundant description of these constituents will be omitted.

Exemplary Embodiment 1 has described a case where the printer 100 serving as the "printing apparatus" is a serial printer. However, the "printing apparatus" may be a line printer.

Figure 9:
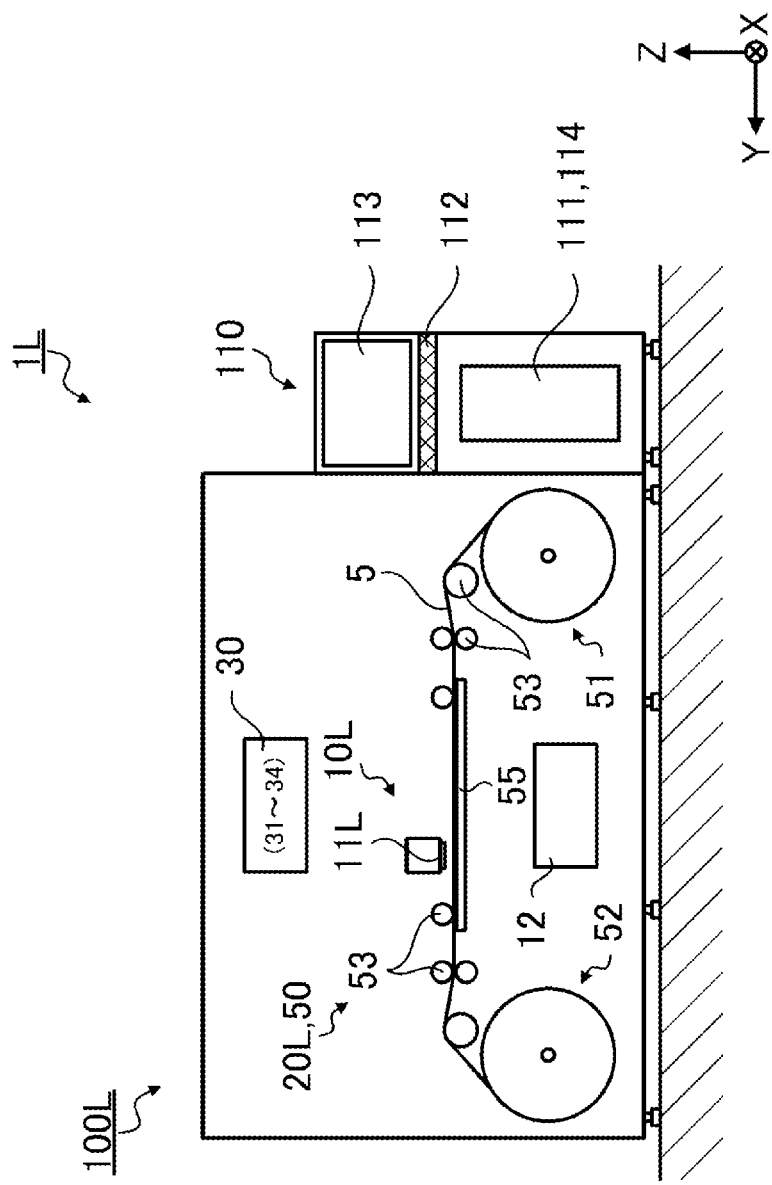
FIG. 9 is a front view illustrating a configuration of a printing system according to Exemplary Embodiment 2.
Figure 10:
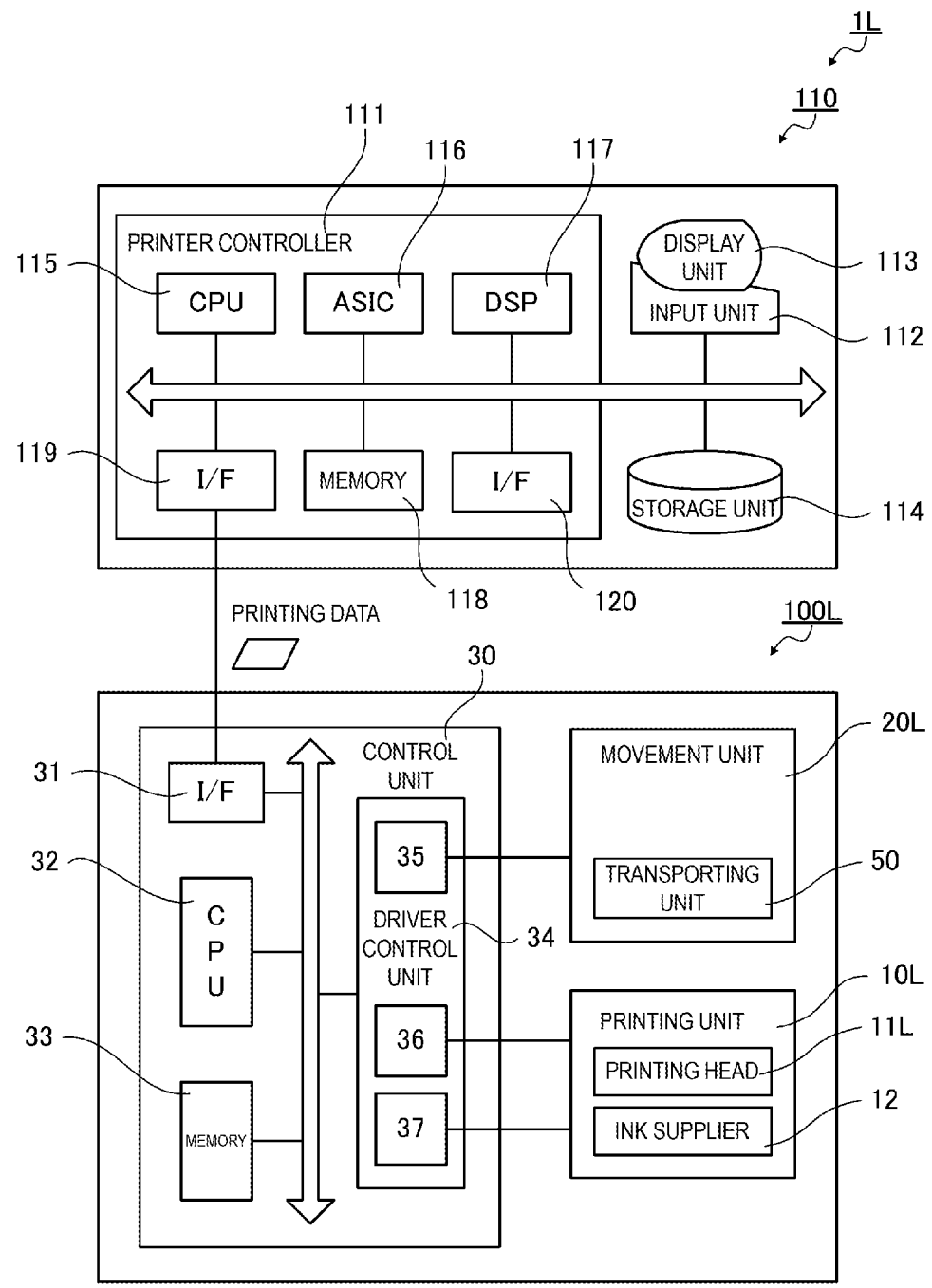
FIG. 10 is a block diagram illustrating a configuration of the printing system according to Exemplary Embodiment 2.

FIG. 9 is a front view illustrating a configuration of a printing system 1L according to Exemplary Embodiment 2, and FIG. 10 is a block diagram of the same.

The printing system 1L includes, instead of the printer 100 according to Exemplary Embodiment 1, a printer 100L serving as the "printing apparatus". The printer 100L is an ink-jet line printer that prints a desired image (print image) on the long-length printing medium 5 supplied in a roll shape, based on printing data received from the image processing device 110.

Basic Configuration of Printer 100L

The printer 100L includes a printing unit 10L, a movement unit 20L, a control unit 30L, and the like. The printer 100L that has received the printing data from the image processing device 110 controls the printing unit 10L and the movement unit 20L by the control unit 30L to print (image-form) an image on the printing medium 5.

The printing unit 10L includes a printing head 11L, an ink supplier 12L, and the like.

The movement unit 20L includes the transporting unit 50, and the like. The transporting unit 50 includes the supply unit 51, the accommodation unit 52, the transport rollers 53, the platen 55, and the like.

Figure 11:
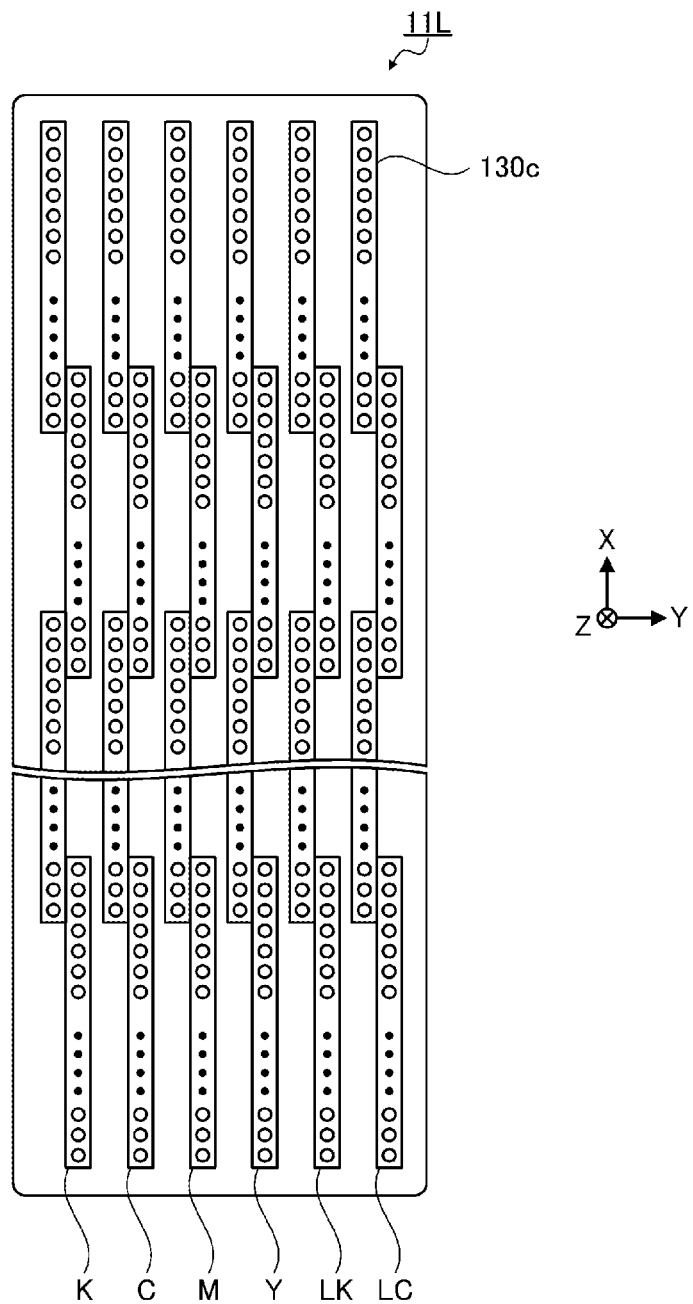
FIG. 11 is a schematic diagram illustrating an example of arrangement of nozzles when viewed from a lower surface of a printing head included in a printing apparatus according to Exemplary Embodiment 2.

FIG. 11 is a schematic diagram illustrating an example of arrangement of nozzles when viewed from a lower surface of a printing head 11L.

As illustrated in FIG. 11, the printing head 11L is a line head, and includes six nozzle rows (a black ink nozzle row K, a cyan ink nozzle row C, a magenta ink nozzle row M, a yellow ink nozzle row Y, a gray ink nozzle row LK, and a light cyan ink nozzle row LC) respectively arranged with a plurality of nozzle chips 130c respectively including a plurality of nozzles configured to discharge a single ink in each row in a width direction (the X-axis direction) of the printing medium 5, which intersects with the transport direction, at a length exceeding a maximum width of the printing medium 5.

The nozzle chips 130c are provided so that three nozzles at an end of one of the nozzle chips 130c mutually overlap with three other nozzles at another end of another adjacent one of the nozzle chips 130c at positions in the Y-axis direction.

Figure 12:
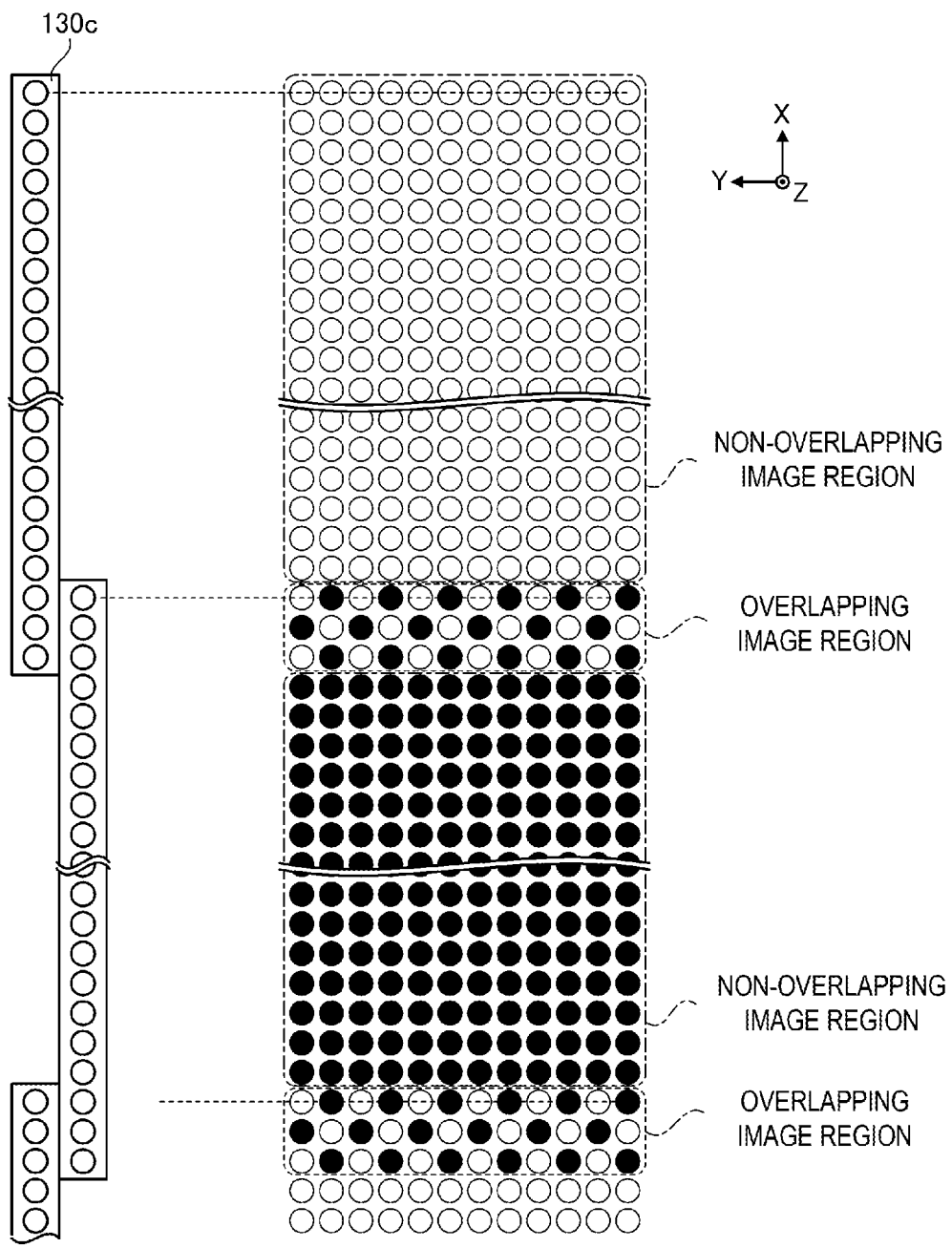
FIG. 12 is a conceptual diagram illustrating dot rows formed in a line head.

FIG. 12 illustrates dot rows formed by the line head including the plurality of nozzle chips 130c.

By causing the printing medium 5 to move on the platen 55 in the transport direction (the +Y direction), and causing the nozzles to discharge ink droplets at predetermined timings, a print image can be formed.

In the line head arranged with the nozzle chips 130c in series, banding (white lines due to expanded gaps and black lines due to narrowed gaps) may still occur at joints of the nozzle chips 130c. In order to reduce banding, the nozzle chips 130c are provided so that three nozzles at the end of one of the nozzle chips 130c mutually overlap with three other nozzles at the other end of another adjacent one of the nozzle chips 130c at positions in the Y-axis direction to disperse band boundaries to suppress banding due to strong and light lines from occurring. That is, a non-overlapping image region and an overlapping image region constitute a print image.

Even with printing with the line head configured as described above, variations in ink discharge characteristics of the nozzle chips 130c and variations in accuracy of attachment of the nozzle chips 130c, for example, may cause banding where a concentration difference and a color difference are observed to occur in an overlapping image region. For the banding, how much banding is observed can be reduced with an image processing method based on a similar idea to the idea that has derived the image processing method described in Exemplary Embodiment 1.

That is, the image processing method according to Exemplary Embodiment 2 includes correcting, in accordance with a degree of reduction in a dot coverage below a predetermined dot coverage in an overlapping image region that undergoes printing by the first nozzle group and the second nozzle group, at least either of a first sharing ratio for the first nozzle group sharing positions of dots to be formed in the overlapping image region and a second sharing ratio for the second nozzle group sharing positions of dots to be formed in the overlapping image region to allow a total ratio of the first sharing ratio and the second sharing ratio to exceed 100%, and correcting a color conversion table used to convert color space data of image data corresponding to the overlapping image region into color space data of printing data to correct colors of a print image of the overlapping image region printed based on the first sharing ratio and the second sharing ratio after the correcting of at least either of the first sharing ratio and the second sharing.

Note that the first nozzle group denotes some of the nozzle chips 130c adjacent to each other, whereas the second nozzle group denotes the other of the nozzle chips 130c adjacent to each other.

Since a head configuration differs from the head configuration according to Exemplary Embodiment 1, printing data is generated by performing, instead of the rasterization processing (the allocation processing to passes), allocation processing to the nozzle chips 130c. In the allocation processing to the nozzle chips 130c, a sharing ratio used for a concentration correction is corrected.

With the image processing method, the color conversion table creation method, the image processing device, and the printing system according to Exemplary Embodiment 2 described above as well, similar effects to the effects acquired with Exemplary Embodiment 1 can be acquired.

Note that the invention is not limited to the exemplary embodiments described above, and various modifications and improvements can be made on the exemplary embodiments described above. Modification Examples are described below. Note that, the same constituents as those in the exemplary embodiment described above are given the same reference signs, and redundant description of these constituents will be omitted.

Modification Example 1

Figure 13:
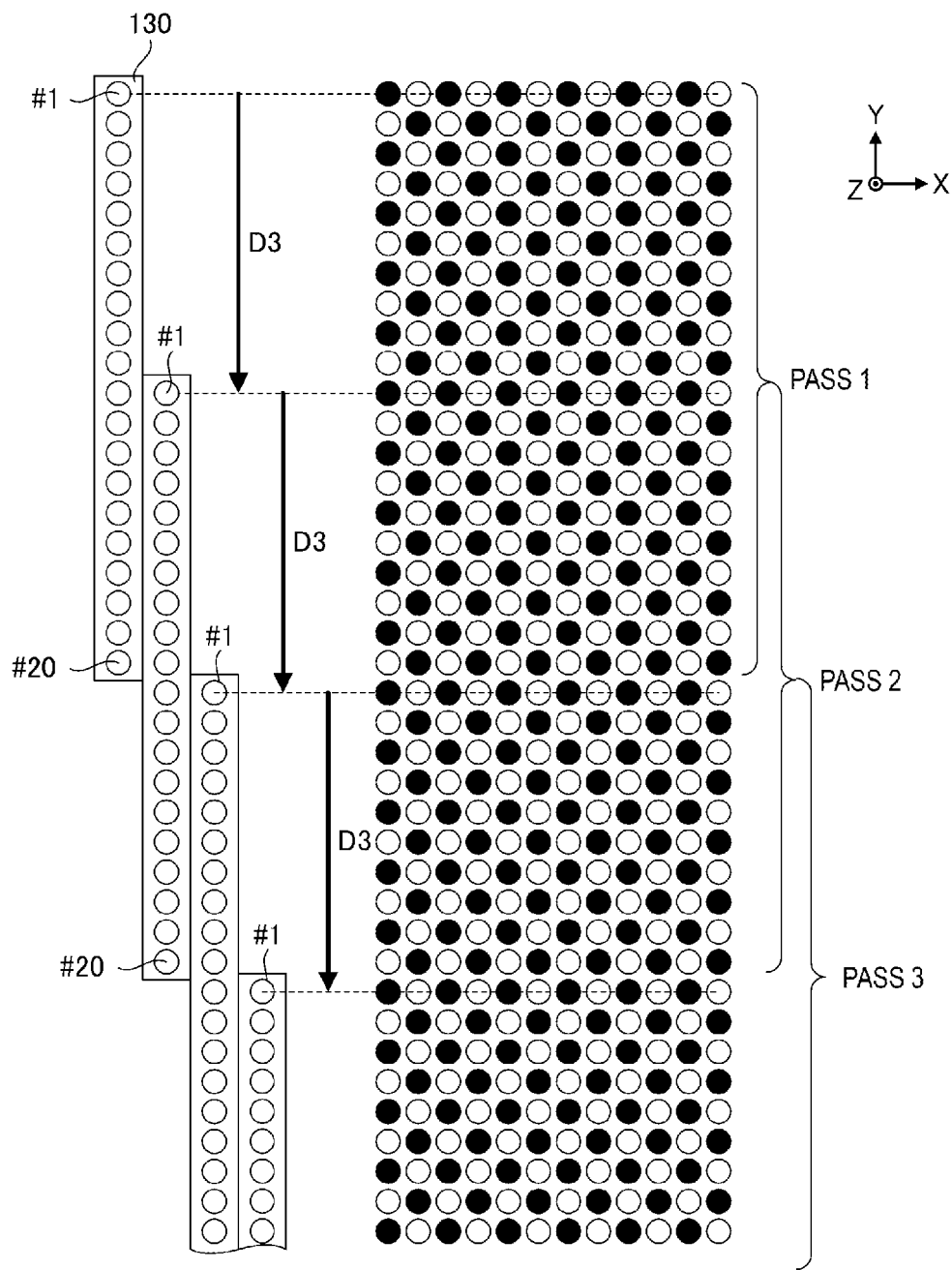
FIG. 13 is a conceptual diagram illustrating a print image printed by a printing system according to Modification Example 1.

FIG. 13 is a conceptual diagram illustrating a print image printed by a printing system according to Modification Example 1.

Exemplary Embodiment 1 has described a case where a print image includes a non-overlapping image region and an overlapping image region, as illustrated in FIG. 6. However, the invention is not limited to such printing. For example, printing where a whole overlapping image region constitutes a print image, as illustrated in FIG. 13, may be performed.

In the example illustrated in FIG. 13, a sub scanning feeding amount is specified to D3 representing an amount equivalent to one half of a length of each of the nozzle rows 130 so that respective halves of partial images to be formed through pass operations overlap with each other.

In the printing described above, no such banding due to a concentration difference and a color difference between a non-overlapping image region and an overlapping image region occurs. However, a time difference between timings of discharging ink droplets in the pass 1 and the pass 2, as well as shifts in position of dots to be formed between the pass 1 and the pass 2, for example, may slightly reduce a concentration, compared with a case when printing is performed in a single pass.

With a concentration correction, and a color correction after the concentration correction, as described above as well, similar effects to the effects of Exemplary Embodiment 1 can be acquired by applying the image processing method described in Exemplary Embodiment 1.

Modification Example 2

In the description of the image processing method according to Exemplary Embodiment 1, a correction (the sharing ratio correction step) for raising a sharing ratio (at least either of the first sharing ratio for the first nozzle group sharing positions of dots to be formed in the overlapping image region and the second sharing ratio for the second nozzle group sharing positions of dots to be formed in the overlapping image region) is performed during the allocation processing configured to allocate to passes the image data 83 (see FIG. 3) arranged in a matrix after having undergone the half tone processing during the rasterization processing configured to rearrange the image data 83 in a dot formation order for printing. However, the invention is not limited to the method.

For example, before performing the half tone processing, the image data 82 (see FIG. 3) in a CMYK color space after having undergone the color conversion processing may be allocated to passes, i.e., the image data 82 may be converted into data developed to the nozzles (image data in a CMYK color space) to perform a correction so as to raise a sharing ratio for the data when the half tone processing is performed.

Figure 14:
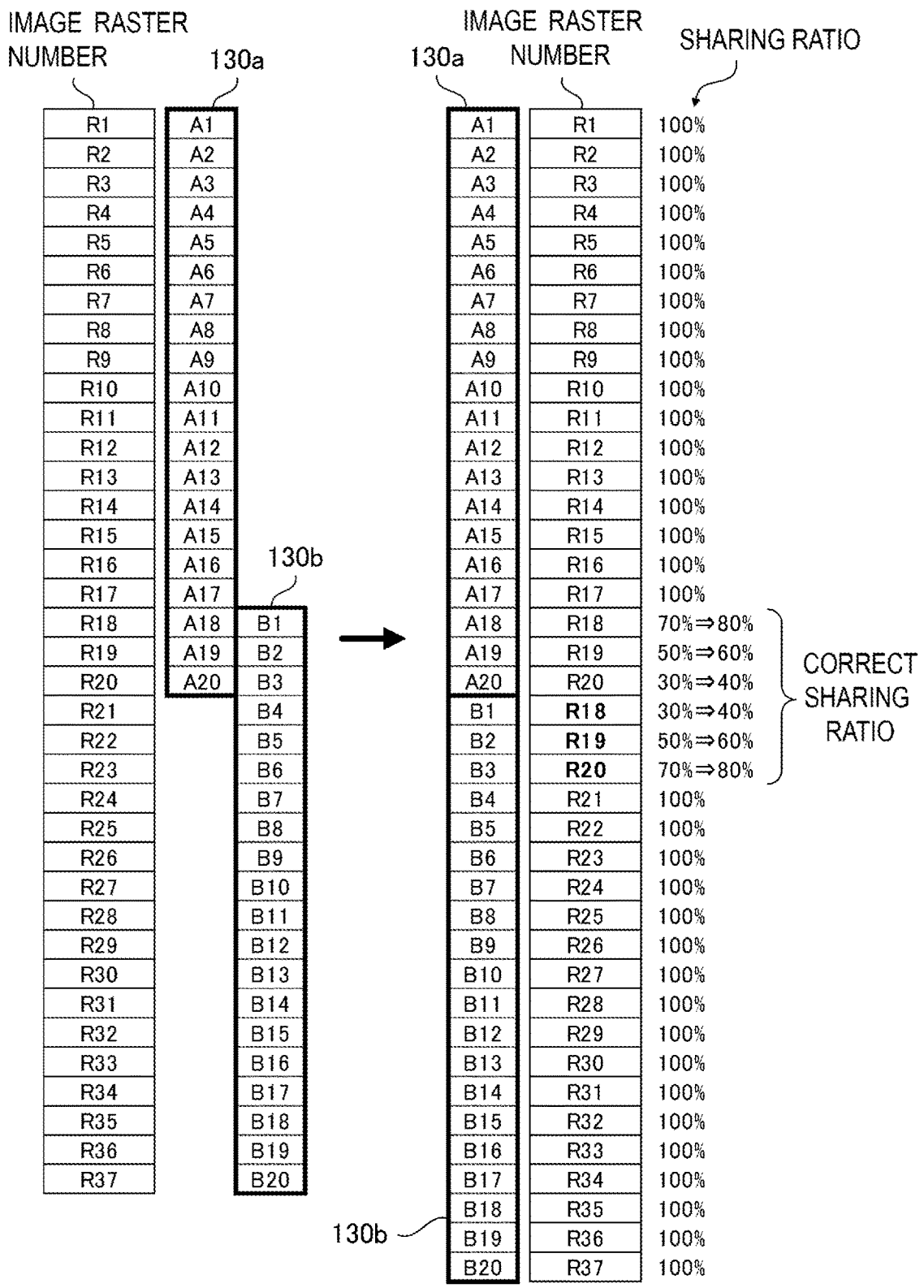
FIG. 14 is a conceptual diagram illustrating half tone processing in an image processing method according to Modification Example 2.

FIG. 14 is a conceptual diagram illustrating half tone processing in an image processing method according to Modification Example 2.

In the image processing method according to the modification example, before performing the half tone processing, raster data of image data is allocated to the nozzles for passes. FIG. 14 illustrates how the allocation proceeds. Rasters R1 to R20 are allocated to a nozzle row 130a (nozzles A1 to A20) serving as the first nozzle group, whereas rasters R18 to R37 are allocated to a nozzle row 130b (nozzles B1 to B20) serving as the second nozzle group. Note that the rasters R18 to R20 corresponding to an overlapping image region are allocated to both of the nozzle row 130a and the nozzle row 130b. Image data corresponding to a subsequent pass is similarly developed to the nozzle rows 130 for passes to allow the developed image data to undergo the half tone processing.

The half tone processing handles high-tone-number (256 tones) data based on the dot generation ratio table 92 (see FIG. 3) in which tone values (0 to 255) and dot generation ratios are associated with each other, as described above. At this time, by specifying as a dot generation ratio a value acquired by multiplying a dot generation ratio acquired by referring to the dot generation ratio table 92 with a sharing ratio illustrated in FIG. 14, 1-bit data indicative of a result of processing (two tones (dot and no dot) and 2-bit data) indicative of four tones (no dot, small dot, medium dot, and large dot) are derived. A value of a sharing ratio before correction is set so as to reach 100% for a non-overlapping image region, and is set so that a total reaches 100% for an overlapping image region.

Based on this, the sharing ratio is corrected as described below, for example.

Raster R18: (nozzle A18, nozzle B1)=(70%, 30%)-> (80%, 40%)

Raster R19: (nozzle A19, nozzle B2)=(50%, 50%)-> (60%, 60%)

Raster R20: (nozzle A20, nozzle B3)=(30%, 70%)-> (40%, 80%)

By correcting a sharing ratio at a stage of the half tone processing, as described above, an amount (a concentration) of ink droplets to be discharged onto an overlapping image region can be corrected to 120%.

Contents derived from the exemplary embodiments are as follows.

An image processing method according to an aspect of the application is for generating, based on image data, printing data used to cause a printing apparatus to execute printing. The printing apparatus is configured to cause a first nozzle group and a second nozzle group to discharge ink droplets, to form dots on a printing medium, and to print a print image based on the image data. The image processing method includes correcting, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and correcting a color conversion table used to convert color space data of the image data corresponding to the overlapping image region into color space data of the printing data to correct colors of a print image of the overlapping image region printed based on the first sharing ratio and the second sharing ratio after the correcting of at least either of the first sharing ratio and the second sharing ratio.

With the configuration, in accordance with a degree of reduction in a dot coverage below a predetermined dot coverage in an overlapping image region that undergoes printing by the first nozzle group and the second nozzle group, at least either of a first sharing ratio for the first nozzle group sharing positions of dots to be formed in the overlapping image region and a second sharing ratio for the second nozzle group sharing positions of dots to be formed in the overlapping image region is corrected to allow a total ratio of the first sharing ratio and the second sharing ratio to exceed 100%. That is, by performing a correction so that the greater the degree of reduction in concentration in a print image due to a reduction in dot coverage in an overlapping image region, the greater the total value of the first sharing ratio and the second sharing ratio, ink droplets landing in the overlapping image region increase, further expanding areas (dot areas) on a surface of a printing medium in which ink droplets wet-spread. As a result, in accordance with a degree of reduction in dot coverage in an overlapping image region, a subsequent reduction in concentration in a print image can be suppressed (corrected).

When a print image of an overlapping image region is to be printed based on the first sharing ratio and the second sharing ratio after at least either of the first sharing ratio and the second sharing ratio is corrected in the correcting of a sharing ratio, colors of the print image are corrected by correcting a color conversion table used to convert color space data of image data corresponding to the overlapping image region into color space data of printing data. That is, since a color conversion table is corrected as premises for a correction of a concentration in a print image of an overlapping image region in the correcting of a sharing ratio, a fine print image where both of a concentration and a color difference in a print image are corrected can be acquired.

In the image processing method described above, the print image includes a non-overlapping image region that undergoes printing by the first nozzle group or the second nozzle group and the overlapping image region, and, in the correcting of colors, colors of the print image of the overlapping image region are corrected based on a print image of the non-overlapping image region.

With the configuration, to print a print image including a non-overlapping image region that undergoes printing by the first nozzle group or the second nozzle group and an overlapping image region that undergoes printing by the first nozzle group and the second nozzle group, i.e., to print in an overlapped manner a region that undergoes printing by the first nozzle group and a region that undergoes printing by the second nozzle group, in the correcting of colors, colors of a print image of the overlapping image region are corrected based on a print image of a non-overlapping image region.

By correcting colors of a print image of an overlapping image region in accordance with a print image of a non-overlapping image region, banding due to a color difference between a print image of a non-overlapping image region and a print image of an overlapping image region can be suppressed.

An image processing device according to a further aspect of the application is for generating, based on image data, printing data used to cause a printing apparatus to execute printing. The printing apparatus is configured to cause a first nozzle group and a second nozzle group to discharge ink droplets, to form dots on a printing medium, and to print a print image based on the image data, to generate, based on the image data, printing data used to execute printing. The image processing device includes, a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and a color correction unit configured to correct a color conversion table used to convert color space data of the image data corresponding to the overlapping image region into color space data of the printing data to correct colors of a print image of the overlapping image region printed based on the first sharing ratio and the second sharing ratio after the correcting of at least either of the first sharing ratio and the second sharing ratio by the sharing ratio correction unit.

With the configuration, in accordance with a degree of reduction in a dot coverage below a predetermined dot coverage in an overlapping image region that undergoes printing by the first nozzle group and the second nozzle group, at least either of a first sharing ratio for the first nozzle group sharing positions of dots to be formed in the overlapping image region and a second sharing ratio for the second nozzle group sharing positions of dots to be formed in the overlapping image region is corrected to allow a total ratio of the first sharing ratio and the second sharing ratio to exceed 100%. That is, by performing a correction so that the greater the degree of reduction in concentration in a print image due to a reduction in dot coverage in an overlapping image region, the greater the total value of the first sharing ratio and the second sharing ratio, ink droplets landing in the overlapping image region increase, further expanding areas (dot areas) on a surface of a printing medium in which ink droplets wet-spread. As a result, in accordance with a degree of reduction in dot coverage, a subsequent reduction in concentration in a print image can be suppressed (corrected).

When a print image of an overlapping image region is to be printed based on the first sharing ratio and the second sharing ratio after at least either of the first sharing ratio and the second sharing ratio is corrected by the sharing ratio correction unit, colors of the print image are corrected by correcting a color conversion table used to convert color space data of image data corresponding to the overlapping image region into color space data of printing data. That is, since a color conversion table is corrected as premises for a correction of a concentration in a print image of an overlapping image region by the sharing ratio correction unit, a fine print image where both of a concentration and a color difference in a print image are corrected can be acquired.

A printing system according to a still further aspect of the application includes a printing apparatus configured to cause a first nozzle group and a second nozzle group to discharge ink droplets, to form dots on a printing medium, and to print a print image based on image data, and an image processing device including a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and a color correction unit configured to correct a color conversion table used to convert color space data of the image data corresponding to the overlapping image region into color space data of printing data to correct colors of a print image of the overlapping image region printed based on the first sharing ratio and the second sharing ratio after the correcting of at least either of the first sharing ratio and the second sharing ratio by the sharing ratio correction unit. The image processing device is configured to cause the printing apparatus to generate, based on the image data, printing data used to execute printing.

With the configuration, when the printing system includes the printing apparatus and the image processing device described above, fine printing can be performed, where both of a concentration and a color difference are corrected with respect to banding to occur in an overlapping image region.

The printing system described above may include a user interface configured to allow at least either of the first sharing ratio and the second sharing ratio to be changed.

With the configuration, when the printing system includes the user interface configured to allow at least either of the first sharing ratio and the second sharing ratio to be changed, a user can adjust, before performing printing, how much a degree of a reduction in concentration in a print image accompanying a reduction in dot coverage in an overlapping image region can be suppressed (corrected).

The printing system described above may include a user interface configured to allow a degree of correction for the color conversion table to be set.

With the configuration, when the printing system includes the user interface configured to allow a degree of correction of a color conversion table to be set, a user can correct, before performing printing, colors of a print image of an overlapping image region printed based on the first sharing ratio and the second sharing ratio after at least either of the first sharing ratio and the second sharing ratio is corrected by the sharing ratio correction unit.

A color conversion table creation method according to a still further aspect of the application is configured, for use in a printing apparatus configured to cause a first nozzle group and a second nozzle group to discharge ink droplets, to form dots on a printing medium, and to perform printing, to create a color conversion table used to convert color space data of image data into color space data of printing data. The color conversion table creation method includes performing first printing for forming a first print image based on image data having a single concentration based on a color conversion table before correction in an overlapping image region that undergoes printing by the first nozzle group and the second nozzle group and a non-overlapping image region that undergoes printing by the first nozzle group or the second nozzle group, correcting, in accordance with a degree of reduction in a dot coverage in the first print image formed in the overlapping image region relative to a dot coverage in the first print image formed in the non-overlapping image region, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, performing second printing for forming a second print image based on image data having a single concentration, based on the color conversion table before correction and the first sharing ratio and the second sharing ratio after the correcting of at least either of the first sharing ratio and the second sharing ratio, in the overlapping image region and the non-overlapping image region, and correcting the color conversion table before correction based on the second print image to create another color conversion table used to convert color space data of image data corresponding to the overlapping image region into color space data of printing data corresponding to the overlapping image region.

With the correcting of a sharing ratio according to the configuration, in accordance with a degree of reduction in a dot coverage in the first print image formed in the overlapping image region relative to a dot coverage in the first print image formed in the non-overlapping image region, at least either of a first sharing ratio for the first nozzle group sharing positions of dots to be formed in the overlapping image region and a second sharing ratio for the second nozzle group sharing positions of dots to be formed in the overlapping image region is corrected to allow a total ratio of the first sharing ratio and the second sharing ratio to exceed 100%. That is, by performing a correction so that the greater the degree of reduction in concentration in a print image due to a reduction in dot coverage in an overlapping image region, the greater the total value of the first sharing ratio and the second sharing ratio, ink droplets landing in the overlapping image region increase, further expanding areas (dot areas) on a surface of a printing medium in which ink droplets wet-spread. As a result, in accordance with a degree of reduction in dot coverage in an overlapping image region, a subsequent reduction in concentration in a print image can be suppressed (corrected).

With the correcting of a color conversion table, based on a second print image (an image based on image data having a single concentration, which is to be formed with an overlapping image region and a non-overlapping image region, based on a color conversion table before correction, and the first sharing ratio and the second sharing ratio after at least either of the first sharing ratio and the second sharing ratio is corrected), the color conversion table before correction is corrected, and a color conversion table used to convert color space data of image data corresponding to an overlapping image region into color space data of printing data corresponding to the overlapping image region is created. That is, as premises for a correction of a concentration in a print image of an overlapping image region in the correcting of a sharing ratio, a color conversion table for an overlapping image region is corrected. Therefore, by using a color conversion table before correction, converting color space data of image data corresponding to a non-overlapping image region into color space data of printing data, using a color conversion table corrected in the correcting of a color conversion table, converting color space data of image data corresponding to an overlapping image region into color space data of printing data, and generating printing data, a color difference between a print image of the non-overlapping image region and a print image of the overlapping image region in which a concentration difference is reduced can be reduced. That is, by using a color conversion table created through the color conversion table creation method according to the application, and generating printing data, a fine print image can be printed, where banding due to a concentration and a color difference observed in a print image of an overlapping image region is reduced.

This application claims priority under 35 U.S.C. § 119 to Japanese Patent Application No. 2018-048960, filed Mar. 16 2018. The entire disclosure of Japanese Patent Application No. 2018-048960 is hereby incorporated herein by reference.

What is claimed is:

1. An image processing method for generating, based on image data, printing data used to cause a printing apparatus to execute printing, the printing apparatus being configured to cause a first nozzle group and a second nozzle group to discharge ink droplets to form dots on a printing medium to print a print image based on the image data, the image processing method comprising:
   correcting, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%; and
   correcting a color conversion table used to convert color space data of the image data corresponding to the overlapping image region into color space data of the printing data to correct color of a print image of the overlapping image region printed based on the first sharing ratio and the second sharing ratio after the correcting of the first sharing ratio and the second sharing ratio.

2. The image processing method according to claim 1, wherein
   the print image includes
   a non-overlapping image region that undergoes printing by the first nozzle group or the second nozzle group and the overlapping image region, and
   in the correcting of color, color of the print image of the overlapping image region is corrected based on a print image of the non-overlapping image region.

3. An image processing device for generating, based on image data, printing data used to cause a printing apparatus to execute printing, the printing apparatus being configured to cause a first nozzle group and a second nozzle group to discharge ink droplets to form dots on a printing medium to print a print image based on the image data, the image processing device comprising:
   a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%; and
   a color correction unit configured to correct a color conversion table used to convert color space data of the image data corresponding to the overlapping image region into color space data of the printing data to correct color of a print image of the overlapping image region printed based on the first sharing ratio and the second sharing ratio after the correcting of at least either of the first sharing ratio and the second sharing ratio by the sharing ratio correction unit.

4. A printing system comprising:
   a printing apparatus configured to cause a first nozzle group and a second nozzle group to discharge ink droplets to form dots on a printing medium to print a print image based on image data; and
   an image processing device that includes
   a sharing ratio correction unit configured to correct, in accordance with a degree of reduction in a dot coverage below a predetermined dot coverage in an overlapping image region that undergoes printing by the first nozzle group and the second nozzle group, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%, and
   a color correction unit configured to correct a color conversion table used to convert color space data of the image data corresponding to the overlapping image region into color space data of printing data to correct color of a print image of the overlapping image region printed based on the first sharing ratio and the second sharing ratio after the correcting of at least either of the first sharing ratio and the second sharing ratio by the sharing ratio correction unit,
   wherein the image processing device is configured to generate, based on the image data, the printing data used to cause the printing apparatus to execute printing.

5. The printing system according to claim 4, comprising a user interface configured to allow at least either of the first sharing ratio and the second sharing ratio to be changed.

6. The printing system according to claim 4, comprising a user interface configured to allow a degree of correction for the color conversion table to be set.

7. A color conversion table creation method for creating a color conversion table used to convert color space data of image data into color space data of printing data used to cause a printing apparatus to perform printing, the printing apparatus being configured to cause a first nozzle group and a second nozzle group to discharge ink droplets to form dots on a printing medium, the color conversion table creation method comprising:
   performing first printing for forming a first print image based on image data having a single concentration, based on a color conversion table before correction, in an overlapping image region that undergoes printing by the first nozzle group and the second nozzle group and a non-overlapping image region that undergoes printing by the first nozzle group or the second nozzle group;
   correcting, in accordance with a degree of reduction in a dot coverage in the first print image formed in the overlapping image region relative to a dot coverage in the first print image formed in the non-overlapping image region, at least either of a first sharing ratio for the first nozzle group sharing positions of the dots to be formed in the overlapping image region and a second sharing ratio for the second nozzle group sharing positions of the dots to be formed in the overlapping image region to allow a total ratio of the first sharing ratio and the second sharing ratio to exceed 100%;

performing second printing for forming a second print image based on image data having a single concentration, based on the color conversion table before correction and the first sharing ratio and the second sharing ratio after the correcting of at least either of the first sharing ratio and the second sharing ratio, in the overlapping image region and the non-overlapping image region; and correcting the color conversion table before correction based on the second print image to create a color conversion table used to convert color space data of image data corresponding to the overlapping image region into color space data of printing data corresponding to the overlapping image region.

* * * * *